United States Patent
Kim et al.

(10) Patent No.: US 7,093,184 B2
(45) Date of Patent: Aug. 15, 2006

(54) APPARATUS AND METHOD FOR GENERATING CODES IN A COMMUNICATION SYSTEM

(75) Inventors: Min-Goo Kim, Suwon-shi (KR); Sang-Hyuck Ha, Suwon-shi (KR); Ho-Kyu Choi, Songnam-shi (KR)

(73) Assignee: Samsung Electronics Co., Ltd., (KR)

( * ) Notice: Subject to any disclaimer, the term of this patent is extended or adjusted under 35 U.S.C. 154(b) by 369 days.

(21) Appl. No.: 10/140,854

(22) Filed: May 8, 2002

(65) Prior Publication Data

US 2002/0181603 A1    Dec. 5, 2002

(30) Foreign Application Priority Data

May 8, 2001    (KR)    ............... 2001-25025
Jun. 9, 2001    (KR)    ............... 2001-32299

(51) Int. Cl.
*H03M 13/03*    (2006.01)
(52) U.S. Cl. .................... 714/789; 714/776
(58) Field of Classification Search .............. 714/776, 714/789
See application file for complete search history.

(56) References Cited

U.S. PATENT DOCUMENTS

| 5,983,384 | A | 11/1999 | Ross |
| 6,359,877 | B1 * | 3/2002 | Rathonyi et al. ........... 370/349 |
| 6,877,130 | B1 | 4/2005 | Kim et al. |

OTHER PUBLICATIONS

3GPP TS 25.212 V3.5.0, 3rd Generation Partnership Project; Technical Specification Group Radio Access Network; Multiplexing and channel coding (FDD) (Release 1999), hereafter referred to as 3GPP TS 25.212 V3.5.0.*
European Search Report dated Apr. 22, 2003, issued in a counterpart application, namely, Appl. No. 02010476.6.
Nobelen Van R. et al., "An Adaptive Radio Link Protocol with Enhanced Data Rates for GSM Evolution", IEEE Personal Communications, IEEE Communications Society, vol. 6, No. 1, Feb. 1999, pp. 54-64.
Min Goo Kim, Sang Hyuk Ha; Quasi-Complementary Turbo Codes (QCTC) For Applications In High-Data-Rate Systems; pp. 2381-2385; Modem R&D Team, Telecommunication R&D Center, Samsung Electronics.

* cited by examiner

*Primary Examiner*—Joseph Torres
(74) *Attorney, Agent, or Firm*—Dilworth & Barrese LLP

(57) ABSTRACT

Disclosed is an apparatus and method for generating a QCTC (Quasi-Complementary Turbo Code) considering a characteristic of a turbo code in a packet communication system or a communication system using an ARQ (Automatic Repeat reQuest) scheme by segmenting a length N of the QCTC into a predetermined number of sections, determining SPIDs (Sub-code Packet Identifications) corresponding to the segmented sections, and specifying one of the SPIDs allocated for initial transmission of the sub-code; calculating a number of remaining symbols represented by N-Fs, where N is a length of the QCTC and Fs is a starting symbol position of the sub-code of the QCTC; determining a last symbol position Ls of the sub-code by comparing the number of the remaining symbols with a length of the sub-code; and sequentially transmitting symbols of the sub-code from the starting symbol position Fs to the last symbol position Ls.

22 Claims, 17 Drawing Sheets

APPARATUS AND METHOD FOR GENERATING CODES IN A COMMUNICATION SYSTEM

PRIORITY

This application claims priority to an application entitled "Apparatus and Method for Generating Codes in a Communication System" filed in the Korean Industrial Property Office on May 8, 2001 and assigned Serial No. 2001-25025, and to an application entitled "Apparatus and Method for Generating Codes in a Communication System" filed in the Korean Industrial Property Office on Jun. 9, 2001 and assigned Serial No. 2001-32299, the contents of both of which are incorporated herein by reference.

BACKGROUND OF THE INVENTION

1. Field of the Invention

The present invention relates generally to code generation in a data communications system, and in particular, to an apparatus and method for generating complementary turbo codes, considering the characteristics of turbo codes in a packet communications system or a general communications system that employs a retransmission scheme.

2. Description of the Related Art

In general, an ARQ (Automatic Repeat Request) system using IR (Incremental Redundancy) is classified into an HARQ (Hybrid Automatic Repeat Request) Type II system and an HARQ Type III system. The HARQ Type II system supports a code rate R higher than 1.0 at each transmission, and variably controls an amount of transmission redundancy according to a channel condition. Here, that the code rate R is higher than 1.0 means that the number of codeword symbols is less than the number of information symbols. The HARQ Type II system combines previously received redundancy with currently received redundancy to create a new low code rate codeword, and repeats this process. However, the HARQ Type III system is designed such that a code rate R of a code used at each transmission or retransmission is less than 1.0. This is to make it possible to perform decoding with only the newly received codes when many packets are missing during transmission due to a bad channel condition or detection error. When all of the codes received at code rate R can be independently decoded, the codes are referred to as "self decodable codes" (SDCs).

The HARQ Type II or HARQ Type III system using turbo codes uses quasi-complementary turbo codes (QCTCs) in order to maximize performance of code combining. FIG. 1 illustrates a block diagram of an apparatus for generating QCTCs. The QCTCs are fully described in U.S. Pat. No. 6,877,130, granted on Apr. 5, 2005 to the same assignee herein, the contents of which are hereby incorporated by reference.

Referring to FIG. 1, an encoder 301 generates coded symbols by encoding input encoder packet. The encoder 301 uses a mother code with R=1/5 or with any other code rate. A mother code is determined by the system in use. A turbo code with R=1/5 is used herein as a mother code by way of example. A demultiplexer (DEMUX) 302 groups the coded symbols received from the encoder 301 into information symbols X (303), parity symbols $Y_0$ (313), parity symbols $Y_1$ (323), parity symbols $Y_0'$ (333), and parity symbols $Y_1'$ (343), and outputs the five symbol groups to corresponding sub-block interleavers 304, 314, 324, 334 and 344, respectively. The sub-block interleavers 304, 314, 324, 334 and 344 randomly permute the sequences output from the demultiplexer 302 by sub-block interleaving, and output the permuted symbols. The codeword symbols randomized by the sub-block interleaving are applied to corresponding blocks. The interleaved coded symbols X (306) output from the first interleaver 304 are applied directly to the input of a sequence (or symbol) concatenator 307. The interleaved parity symbols $Y_0$ and $Y_1$ from the second and third interleavers 314 and 324 are input to a first multiplexer (MUX) 305 and the interleaved coded symbols $Y_0'$ and $Y_1'$ from the fourth and fifth interleavers 334 and 344 are input to a second MUX 315. The first MUX 305 multiplexes the interleaved parity symbols $Y_0$ and $Y_1$ and feeds the output (316) to the sequence concatenator 307. The second MUX 315 multiplexes the interleaved parity symbols $Y_0'$ and $Y_1'$ and feeds the output (326) to the sequence concatenator 307. That is, the coded symbols received from the encoder 301 are classified into three sub-groups of the interleaved codeword symbols output from the interleaver 304, and the parity symbols $Y_0$ and $Y_1$ rearranged by the first MUX 305, and the parity symbols $Y_0'$ and $Y_1'$ rearranged by the second MUX 315. Next, sequence (or symbol) concatenator 307 generates one symbol sequence [A:B:C] by sequentially concatenating a sub-block-interleaved information symbol sequence A, and multiplexed parity symbol sequences B and C. A concatenated sequence (or symbol) repeater 308 performs symbol repetition on the symbols from the sequence concatenator 307 according to a preset rule. A symbol puncturer (or sub-code $C_{ij}$ generator) 309 generates sub-codes (i.e., QCTCs) by puncturing the symbols from the concatenated sequence repeater 308 according to a preset rule. An operation of the symbol puncturer 309 will be described in detail. A sub-code generating operation by the sub-code generator 309 is disclosed in Korean Patent Application No. 2001-7357, entitled "Apparatus and Method for Generating Codes in a Communication System", earlier filed by the applicant, the contents of which are incorporated herein by reference.

It is assumed that transmission of a sub-code starts at time k, a sub-code transmitted at time (k+h) is expressed as $C_{ij}(k+h)$, and the coded symbols of a mother code with R=1/5 in FIG. 1 are defined as $C_m(0), C_m(1), \ldots, C_m(N-1)$. The number, N, of the coded symbols is defined as N=L_INF×5 since the mother code rate is 1/5. Here, L_INF denotes the size of an interleaved sub-block, or the number of information symbols.

Step 1: Determining the Length of an Initial Sub-Code

For an initial transmission, one $C_{i0}$ of the first sub-codes $C_{00}, C_{10}, C_{20}$ of available QCTCs is selected according to a given code rate and the length of the selected sub-code $C_{i0}$ is stored as a variable L_SC. The code rate or length L_SC of the sub-code is predetermined in the system according to channel environment including transmission channel condition and input data rate. The description is made in the context of three QCTCs shown in FIG. 3 for better understanding of the present invention, but the number of sub-codes is not limited.

Step 2: Selecting and Transmitting a Sub-code for Initial Transmission

After the length of a sub-code to be transmitted is determined, $C_m(0), C_m(1), \ldots, C_m(L\_SC-1)$ coded symbols are selected among the coded symbols of the mother code. If L_SC exceeds N, $C_m(0), C_m(1), \ldots, C_m(L\_SC-1)$ are transmitted P times and then $C_m(0), C_m(1), \ldots, C_m(q-1)$ are transmitted. Here, P and q are the quotient and remainder of L_SC/N, respectively, and P and q are calculated by $L_{13}$ SC mod N. Then, the variable q is stored for the next transmission for use in detecting the position of the last symbol of the previous transmitted sub-code with respect to the block of interleaved symbols.

Step 3: Determining the Starting Position of a Sub-code for the Next Transmission and the Length of the Sub-code For the next transmission, the code rate R_SC of a new sub-code to be transmitted is determined according to channel environment and the length L_SC of the sub-code is determined according to the determined code rate. The length L_SC and the code rate R_SC are in the relation of $$L\_SC = L\_INF \times (1/R\_SC) \quad (1)$$

An upper layer system transmits the sub-code length L_SC and the sub-code code rate R_SC to the symbol puncturer 309 for each transmission.

Step 4: Selecting and Transmitting a Sub-code for the Next Transmission

After the length L_SC of the sub-code to be transmitted is determined, $C_m(q), C_m(q+1), \ldots, C_m(q+L\_SC-1)$ coded symbols are selected among the coded symbols of the mother code. In other words, as many symbols as the sub-code length are selected from the mother coded symbols starting with the symbol following the last symbol selected for the previous transmission. If q+L_SC exceeds N, N coded symbols starting with $C_m(q)$ are selected recursively and transmitted P times and then the remaining q coded symbols are sequentially transmitted. Here, P and q are the quotient and remainder of $(q+L_{13} SC)/N$, respectively and P and q are calculated by (q+L_SC) mod N. Then, the variable q is stored for the next transmission for use in detecting the position of the last symbol of the previous transmitted sub-code with respect to the block of interleaved symbols. After the generated sub-code is transmitted, the procedure returns to Step 3.

A sub-code selection method for the QCTCs is illustrated in detail in a lower part of FIG. 1 by way of example. Referring to FIG. 1, a low rate sub-code with a code rate of 1/7 is initially transmitted in Case 1, and a high rate sub-code with a code rate of 4/7 is initially transmitted in Case 2. As seen from the Cases, a codeword having N codeword symbols is repeated P times, and the repeated codeword symbols are sequentially segmented in a proper size according to a length (or code rate) of the sub-code, at each transmission. In real implementation, a buffer is not used to store P codewords, but a single circular buffer is employed to store N codeword symbols, thereby making it possible to enable iterative transmission by continuous feedback. In addition, any reception buffer for storing received codewords and concatenating the stored codewords is available to a receiver as long as it can store N soft metrics.

As described above, the sub code $C_{ij}$ generator corresponding to the last step segments the coded symbols with R=1/5, rearranged according to a specific rule in the preceding steps, in an arbitrary length according to a sub-code code rate Rs=R_SC.

Here, if a starting point Fs for the segmentation is '0', segmentation methods according to respective sub-code code rates are illustrated in FIG. 2. Referring to FIGS. 1 and 2, if a length of the sub-code to be segmented according to a code rate of the corresponding sub-code is given, the QCTC generator (of FIG. 1) segments as many codeword symbols as the corresponding length in the rearranged codeword sequence with R=1/5. Here, the segmentation is divided into two different methods. A first method is to employ a variable starting point Fs. That is, an initially transmitted sub-code starts at Fs=0, and a starting point Fs of a subsequent sub-code is determined as an $(Ls+1)^{th}$ symbol position from the last symbol position Ls of the preceding sub-code. In other words, all of the sub-codes are segmented such that the rearranged codewords with R=1/5 are continuously concatenated in the repeated sequence. This is defined as a sequential starting point mode (SSPM). A second method is to employ a fixed starting point Fs. That is, an initially transmitted sub-code starts at Fs=0, and the following sub-codes start at a predefined starting point Fs. Therefore, not all of the sub-codes may be sequentially concatenated in the sequence where the rearranged codewords with R=1/5 are repeated, and segmented in the form that the codeword symbols can be overlapped according to the sub-code code rate. This is defined as a fixed starting point mode (FSPM).

In application of the QCTCs, the SSPM becomes an optimal scheme in terms of maximizing decoding performance, and can maximize a code combining gain even when considering the IR However, if a code rate of the sub-code is close to 1.0, there is a probability that sub-codes other than the initial sub-code will undesirably become non self-decodable codes (NSDCs). As stated before, it is assumed that both the HARQ Type II and the HAQR Type III are available in the SSPM. If a code rate of all the transmission sub-codes is less than 1.0, the HARQ Type III is employed, whereas if a code rate of a part of the sub-codes is higher than 1.0, the HARQ Type II is employed.

That the currently proposed system employs the HARQ Type III in which a code rate of all of the sub-codes is less than 1.0 means that a receiver performs decoding by sequentially code combining all of the received sub-codes. Further, in the SSPM, a redundancy version (RV) is not exchanged between the transmitter and the receiver. This is because it is not necessary to exchange the redundancy version RV between the transmitter and the receiver in the SSPM.

However, when some sub-codes are missing in a very poor channel environment, a phenomenon of awaiting the missing sub-codes may occur in order to continuously perform code combining. In this case, therefore, self-decodable codes (SDCs) capable of independently decoding the respective sub-codes are required as in the HARQ Type III where the RV is provided. This means that an independent RV is transmitted at each sub-code transmission. In this context, the proposed scheme is the FSPM. In this case, a conventionally used 2-bit SPID (sub-packet identification) is used together with an RV indicator, and therefore, it is possible to independently transmit 4 kinds of RVs or starting points (Fs) at each sub-code transmission. Meanwhile, the FSPM cannot become an optimal scheme in terms of maximizing decoding performance, since symbol overlapping occurs. Further, the FSPM cannot maximize a code combining gain even when considering the IR.

Therefore, in the following description of the present invention, a difference between the SSPM and the FSPM will first be analyzed, and then advantages and disadvantages of the respective schemes will be analyzed. Thereafter, it will be proven that the SSPM is superior to the FSPM. Accordingly, the present invention will provide a method of enabling the FSPM to have the same performance as that of the SSPM. In particular, the present invention will show that the FSPM has a performance degradation problem due to the symbol overlapping and the symbol puncturing, and provide adaptive SPID selection schemes as a solution to the problem.

SUMMARY OF THE INVENTION

It is, therefore, an object of the present invention to provide an apparatus and method for minimizing symbol overlapping and symbol puncturing among sub-codes, when generating QCTCs in an SSPM or FSPM mode.

It is another object of the present invention to provide an SPID selection apparatus and method for minimizing symbol overlapping and symbol puncturing among sub-codes, when a starting point is designated using an SPID in generating QCTCs in an SSPM or FSPM mode.

According to a first aspect of the present invention, there is provided a method for transmitting a sub-code determined by a sub-code rate identical to or different from a code rate of a turbo encoder according to a channel environment from a QCTC generated by the turbo encoder receiving an information stream and operating at the code rate. The method comprises segmenting a length N of the QCTC into a predetermined number of sections, determining SPIDs (Sub-code Packet Identifications) corresponding to the segmented sections, and specifying one of the SPIDs allocated for initial transmission of the sub-code; calculating a number of remaining symbols represented by N–Fs, where N is a length of the QCTC and Fs is a starting symbol position of the sub-code of the QCTC; determining a last symbol position Ls of the sub-code by comparing the number of the remaining symbols with a length of the sub-code; and sequentially transmitting symbols of the sub-code from the starting symbol position Fs to the last symbol position Ls.

Preferably, an SPID nearest to the last symbol position Ls among the SPIDs except the specified SPID is chosen as a starting symbol position of a retransmission sub-code in order to respond to a retransmission request for the transmitted sub-code.

According to a second aspect of the present invention, there is provided a method for transmitting a sub-code determined by a sub-code rate identical to or different from a code rate of a turbo encoder according to a channel environment from a QCTC generated by the turbo encoder receiving an information stream and operating at the code rate. The method comprises calculating a number of remaining symbols represented by N–Fs, where N is a codeword length of the QCTC and Fs is a starting symbol position of the sub-code of the QCTC; determining a last symbol position Ls of the sub-code by comparing the number of the remaining symbols with a length of the sub-code; and sequentially transmitting symbols of the sub-code from the starting symbol position Fs to the last symbol position Ls.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 1:
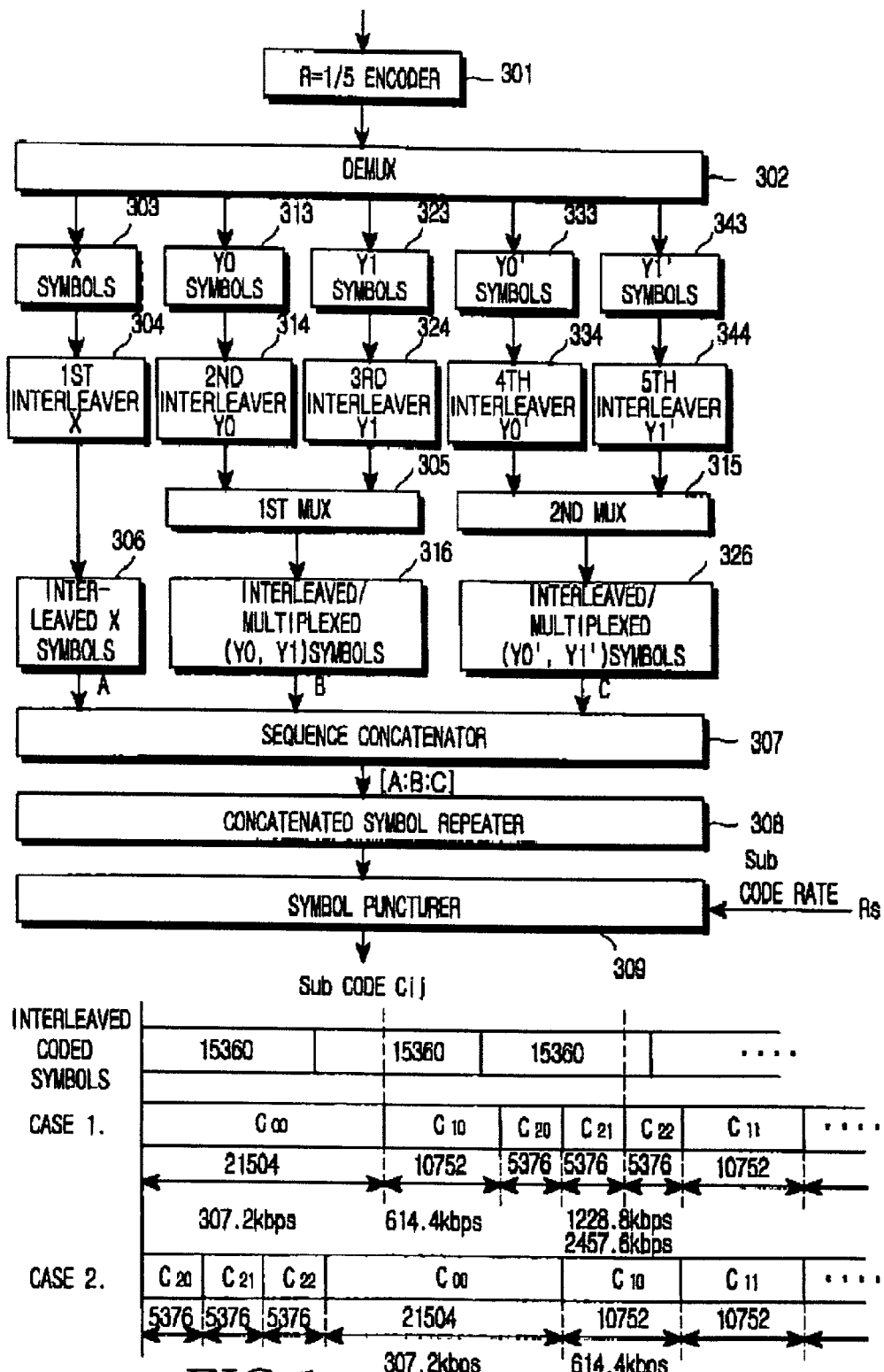
FIG. 1 illustrates a block diagram of a QCTC (Quasi-Complementary Turbo Code) generating apparatus to which the present invention is applied.
Figure 2:
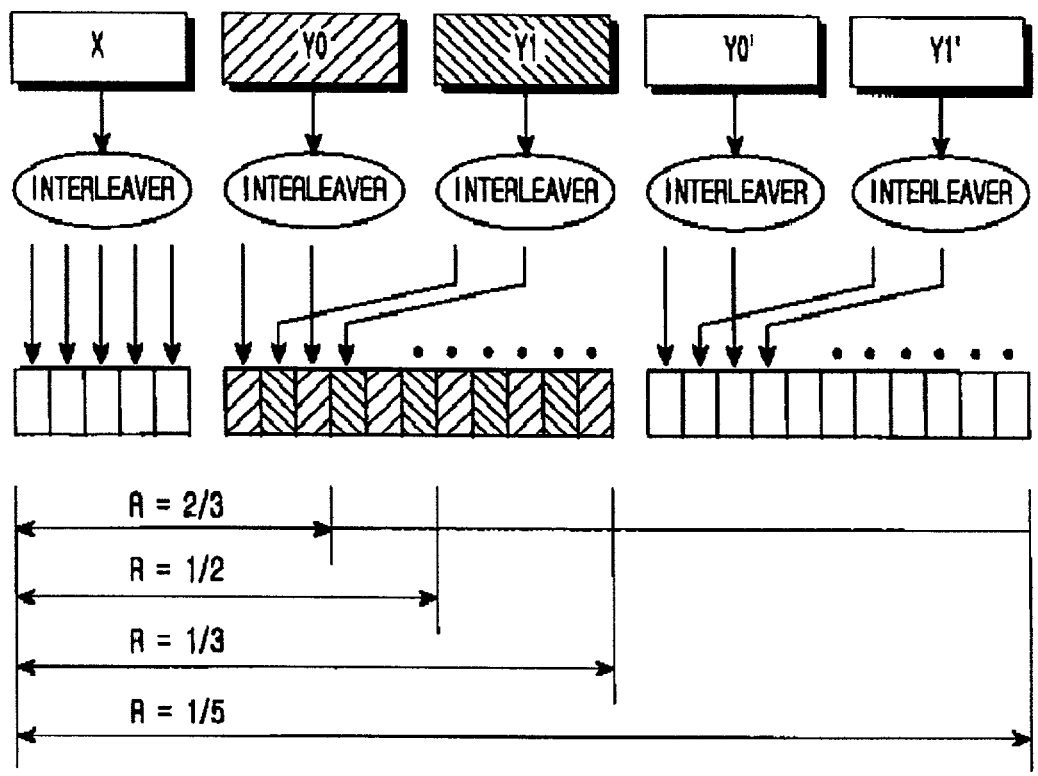
FIG. 2 illustrates an operation of generating sub-codes using a turbo encoder with a mother code rate R=1/5 by the QCTC generating apparatus of FIG. 1.
Figure 16:
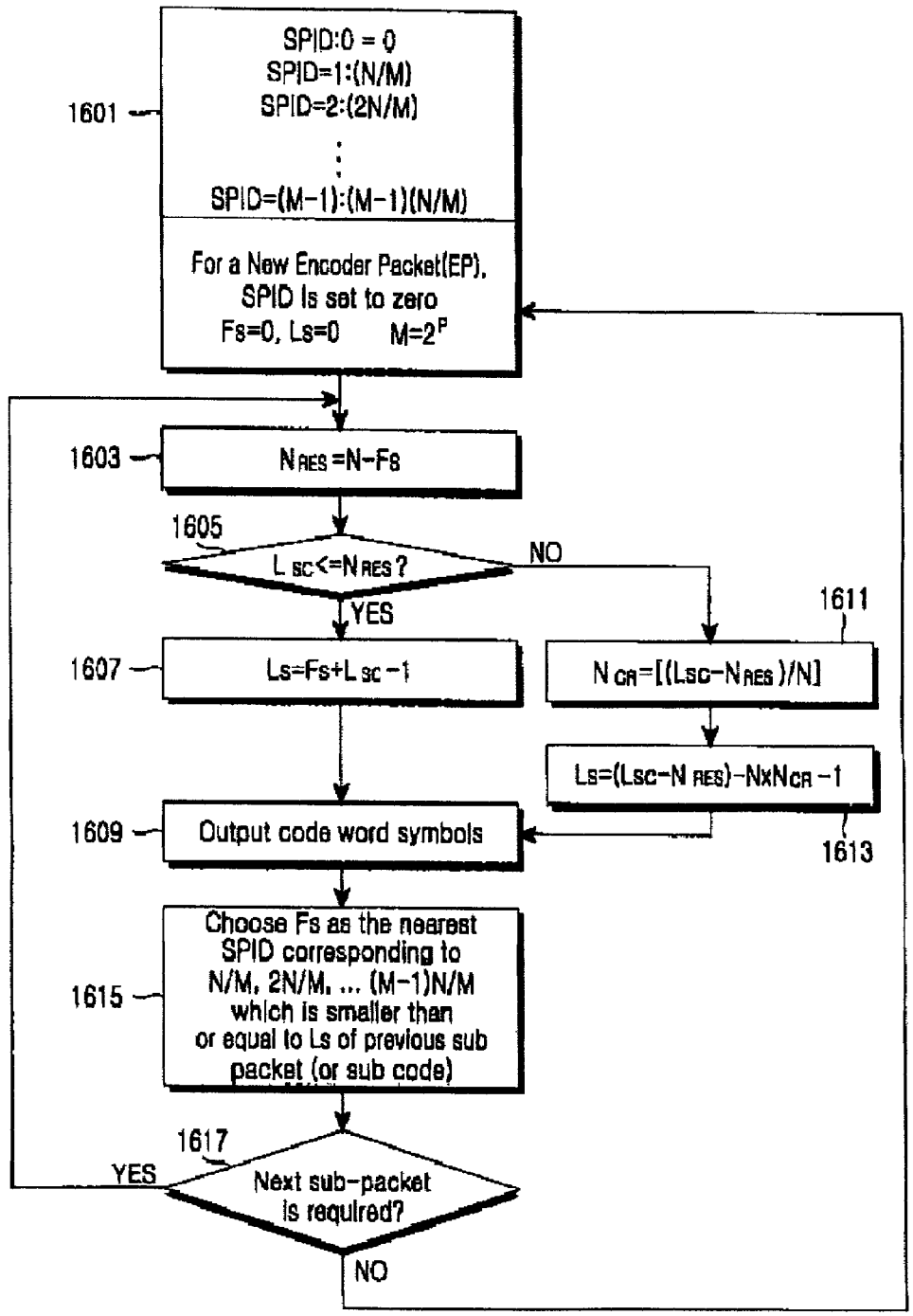
FIG. 16 illustrates an SPID selection procedure according to a fourth embodiment of the present invention (modification of second embodiment)
Figure 17:
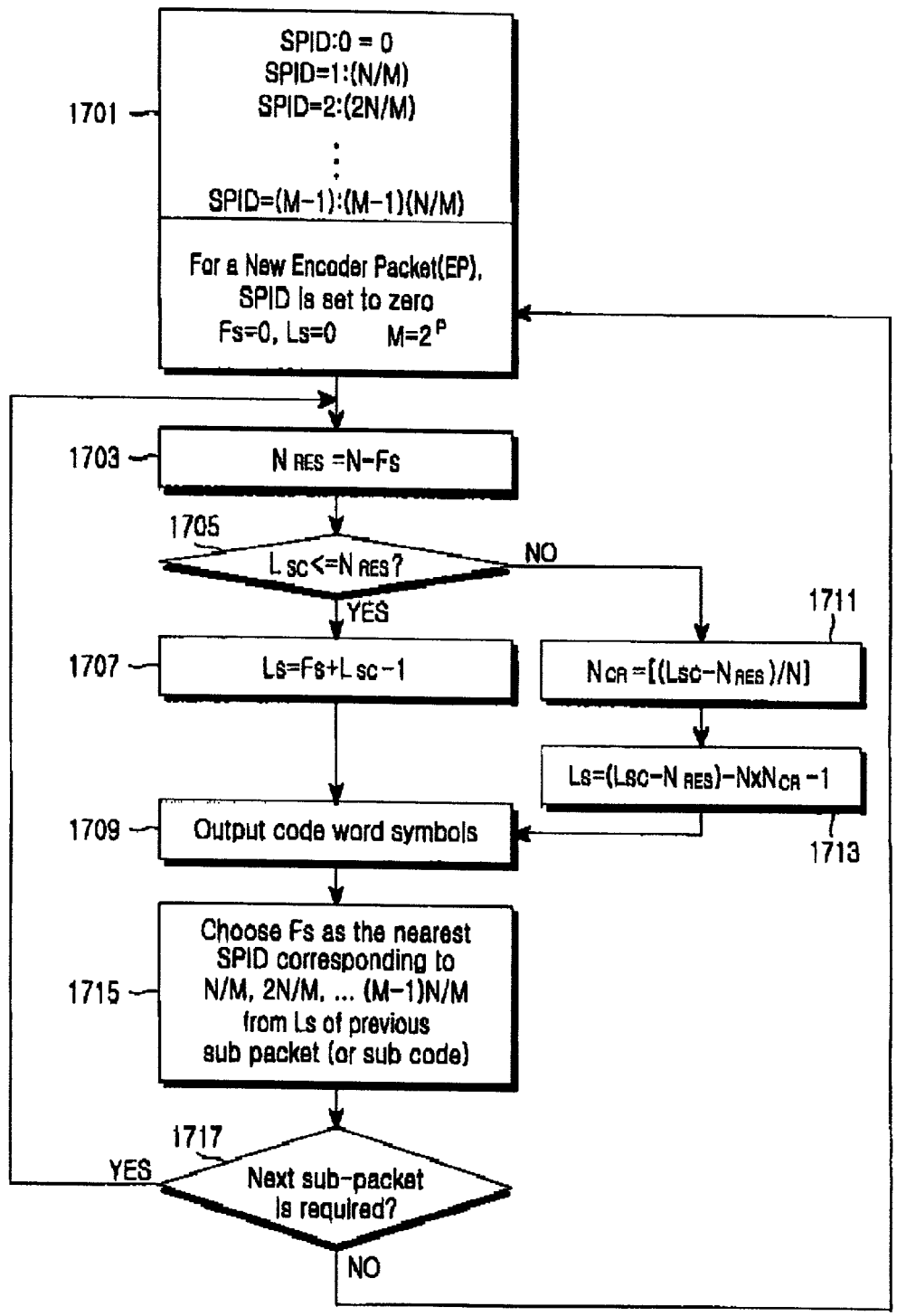
FIG. 17 illustrates an SPID selection procedure according to a fifth embodiment of the present invention (modification of third embodiment).

In the following description, the invention will be applied to a QCTC (or sub-code) generating apparatus illustrated in FIG. 1, and provides a method for transmitting sub-codewords determined by a sub-code rate identical to or different from a code rate of a turbo encoder according to a channel environment from QCTC codewords generated using the turbo encoder receiving an information stream and having a given code rate. The sub-code generating apparatus, to which embodiments of the present invention are applied, can generate sub-codewords in the SSPM or FSPM as described before. Herein, the embodiments of the present invention will be divided into an operation of generating sub-codes in the SSPM (FIG. 15) and an operation of generating sub-codes in the FSPM in order to solve a problem of the SSPM (see FIGS. 10 to 14, and FIGS. 16 and 17). The operation of selecting an SPID and generating sub-codes in the FSPM according to the present invention can be divided into a first embodiment (FIG. 10), a second embodiment (FIGS. 11 and 12), a third embodiment (FIGS. 13 and 14), a fourth embodiment (FIG. 16), and a fifth embodiment (FIG. 17).

A. Fixed Starting Point QCTC Analysis

Fixed Starting Point Mode (FSPM)

Reference will be made to a problem occurring when QCTCs are generated in the FSPM. The FSPM is a transmission scheme for determining 4 available patterns with same sub packet length by fixing initial position of code symbol of respective sub-codes into a 2-bit message transmitting a redundancy version, call an SPID, and then enabling the 4 available sub-codes to become self-decodable codes (SDC). If sub-codes have different sub packet length or code rate then more redundancy patterns are possible with 2 SPID bits. Of course, the number of the SPID bits is not limited. Herein, the SPID bits are assumed to 2 bits by way of example. This scheme, which is originally proposed regardless of the QCTCs, is constructed to uniformly distribute coded symbols with R=1/5 using a random interleaver, provide four starting points, and then determine positions of the respective starting points according to the SPID. Here, a code rate of the sub-codes may have an arbitrary value as illustrated in FIG. 3.

Figure 3:
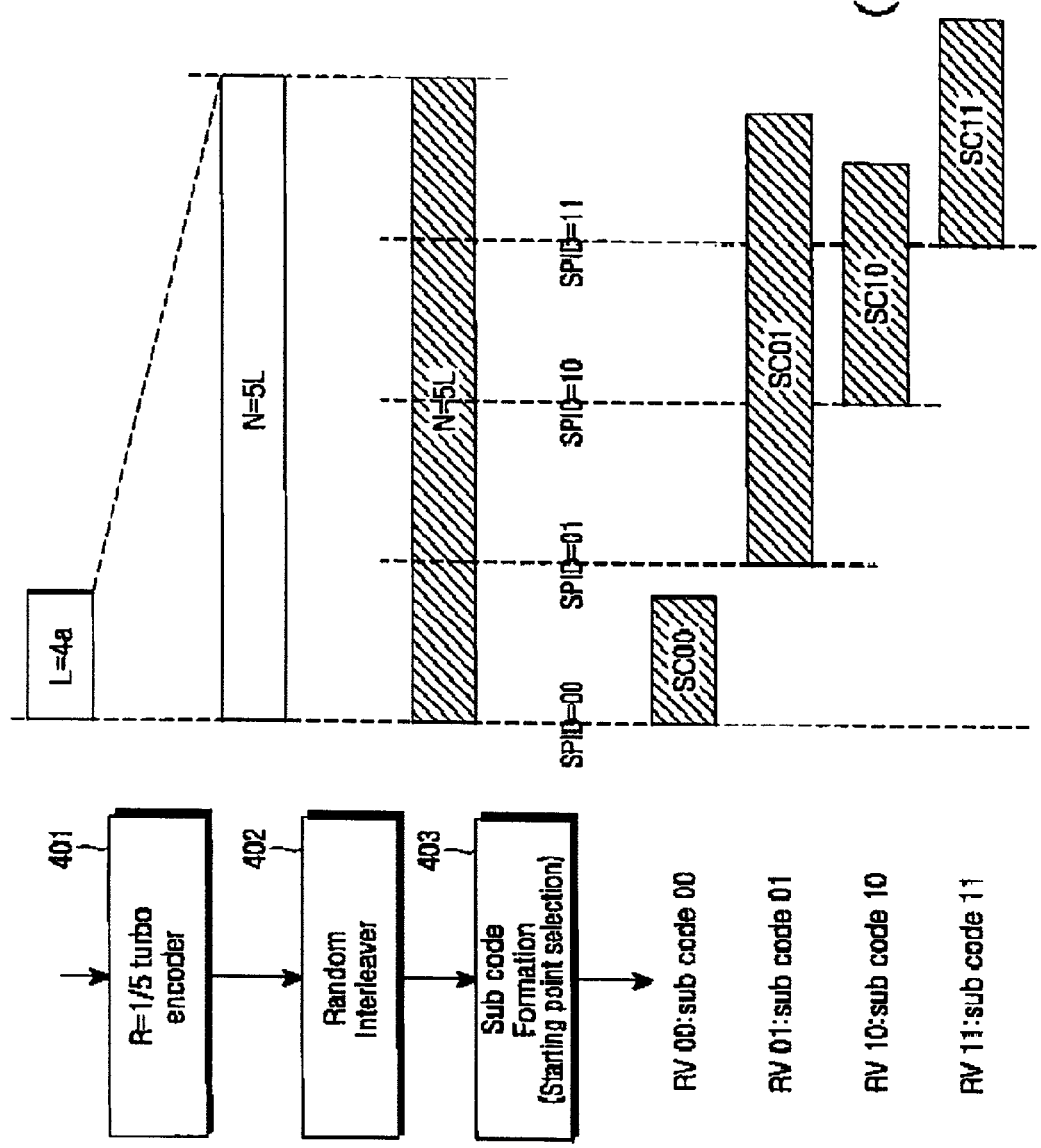
FIG. 3 illustrates an operation of generating sub-codes in an FSPM (Fixed Starting Point Mode) mode by the QCTC generating apparatus of FIG. 1.

Referring to FIG. 3, a turbo encoder 401 turbo-encodes input information with a length L (L=4a) at a code rate R=1/5, and outputs a codeword with a length N (N=5L=20a). A random interleaver 402 randomly interleaves the codeword (or coded symbols) from the turbo encoder 401. A sub-code formation part 403 generates sub-codes based on four starting points previously determined from the interleaved codeword from the random interleaver 402. As illustrated, the starting points are defined as the positions obtained by dividing the codeword with the length N into four equal parts.

Figure 4:
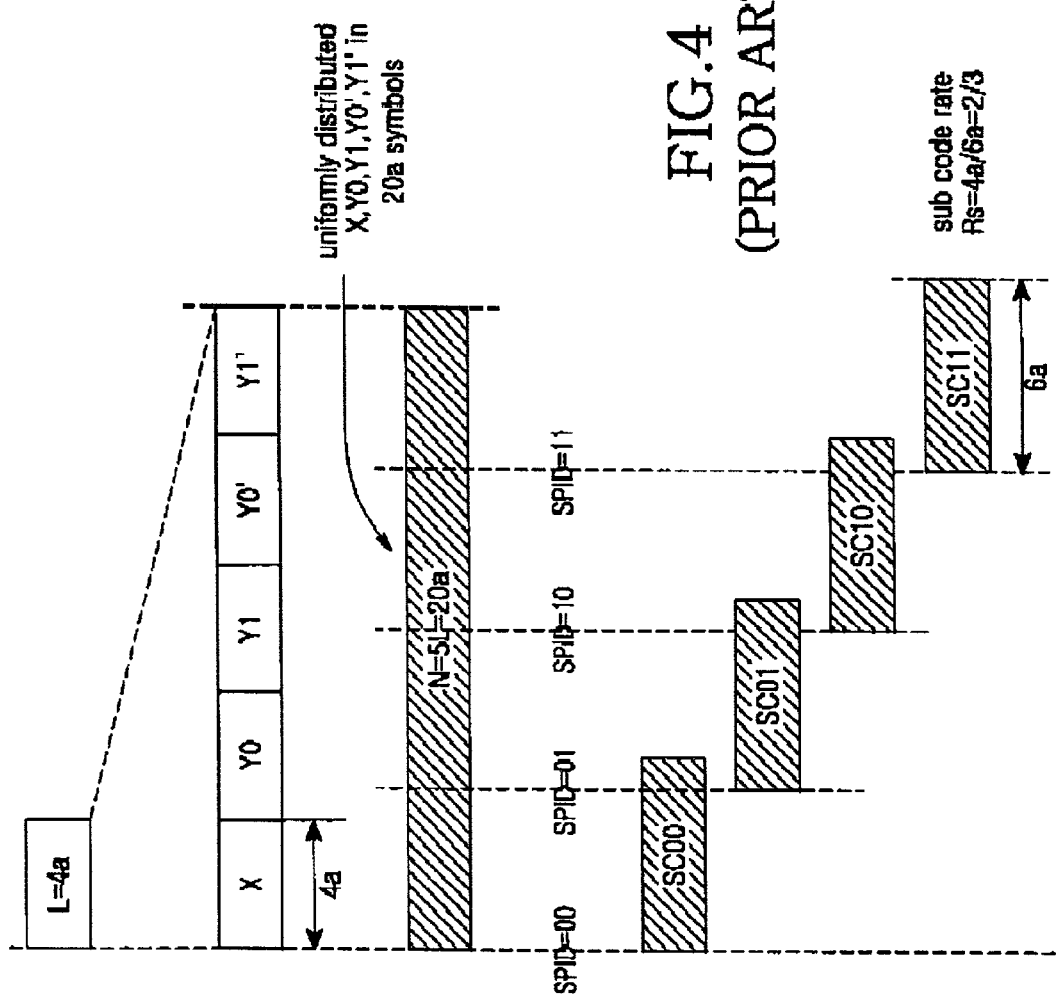
FIG. 4 illustrates an operation of generating sub-codes in the FSPM mode by the QCTC generating apparatus of FIG. 1.

FIG. 4 illustrates a block diagram of an apparatus for generating sub-codes with R=2/3 in the FSPM scheme with a mother code rate R=1/5. Referring to FIG. 4, a turbo encoder 401 turbo-encodes input information with a length L (L=4a) at a code rate R=1/5, and outputs a codeword with a length N (N=5L=20a). A random interleaver 402 randomly interleaves the codeword (or coded symbols) from the turbo encoder 401. A sub-code formation part 403 generates sub-codes based on four starting points previously determined from the interleaved codeword from the random interleaver 402. As illustrated, the starting points are defined as the positions obtained by dividing the codeword with the length N into four equal parts, and each sub-code is a codeword with R=2/3 having 6a coded symbols.

Figure 5:
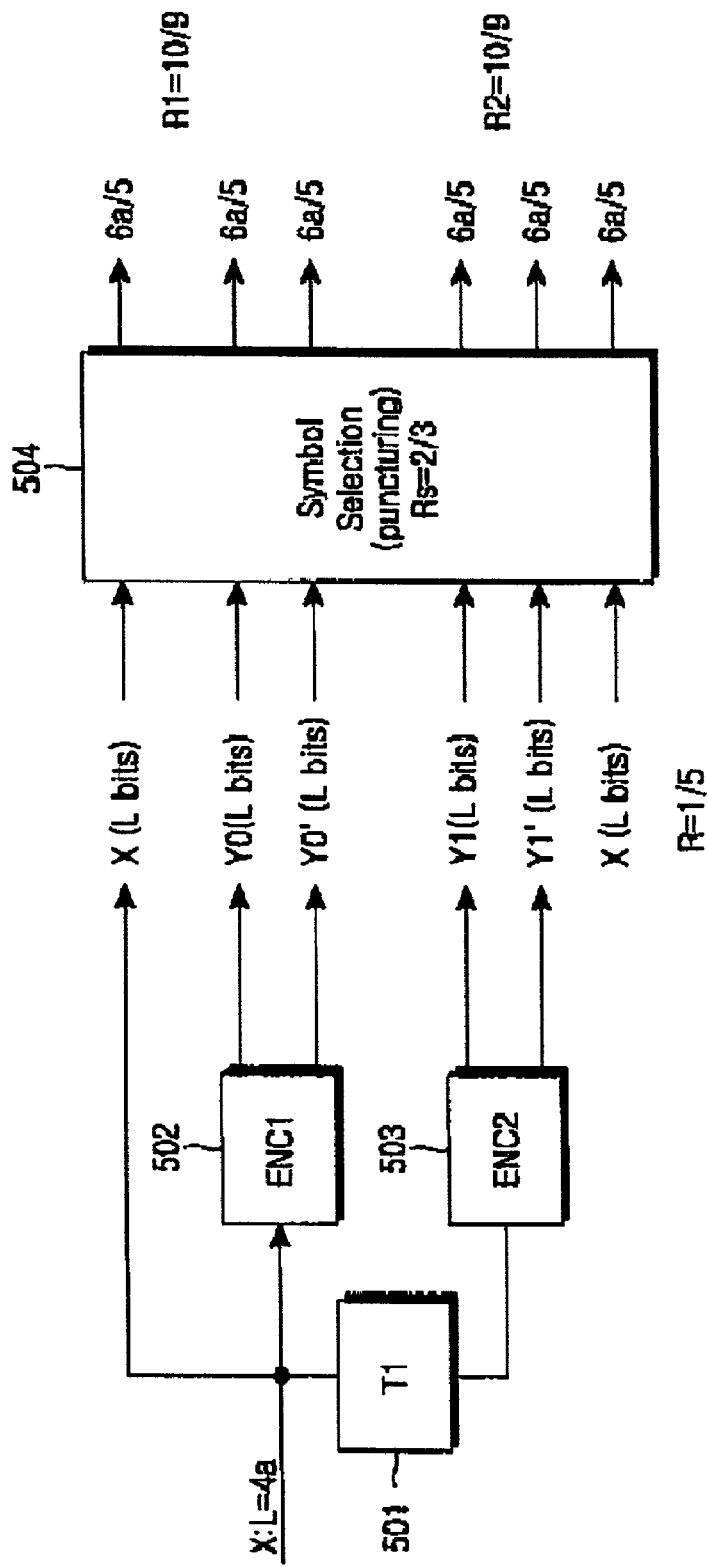
FIG. 5 illustrates a detailed hardware structure of the QCTC generating apparatus of FIG. 1 for generating sub-codes with R=2/3 using a turbo encoder with a mother code rate R=1/5.

FIG. 5 illustrates an apparatus for generating sub-codes with R=2/3, having a turbo encoder with a mother code rate R=1/5. Referring to FIG. 5, reference numerals 501 to 503 correspond to a turbo encoder. A first constituent encoder (ENC1) 502 encodes input information bits X with a length L (=4a), and outputs parity symbols $Y_0$ (L bits) and $Y_0'$ (L bits). An interleaver (T1) 501 interleaves the input information bits according to a preset rule. A second constituent encoder (ENC2) 503 encodes the interleaved symbols from the interleaver 501, and outputs parity symbols $Y_1$ (L bits) and $Y_1'$ (L bits). A symbol selector (or symbol puncturer) 504 performs puncturing on the input information bits X (L bits) and the parity symbols $Y_0$ and $Y_1$, $Y_0'$ and $Y_1'$ according to a preset rule, and outputs sub-codes with a code rate R=2/3.

Decoding in the FSPM

Figure 6:
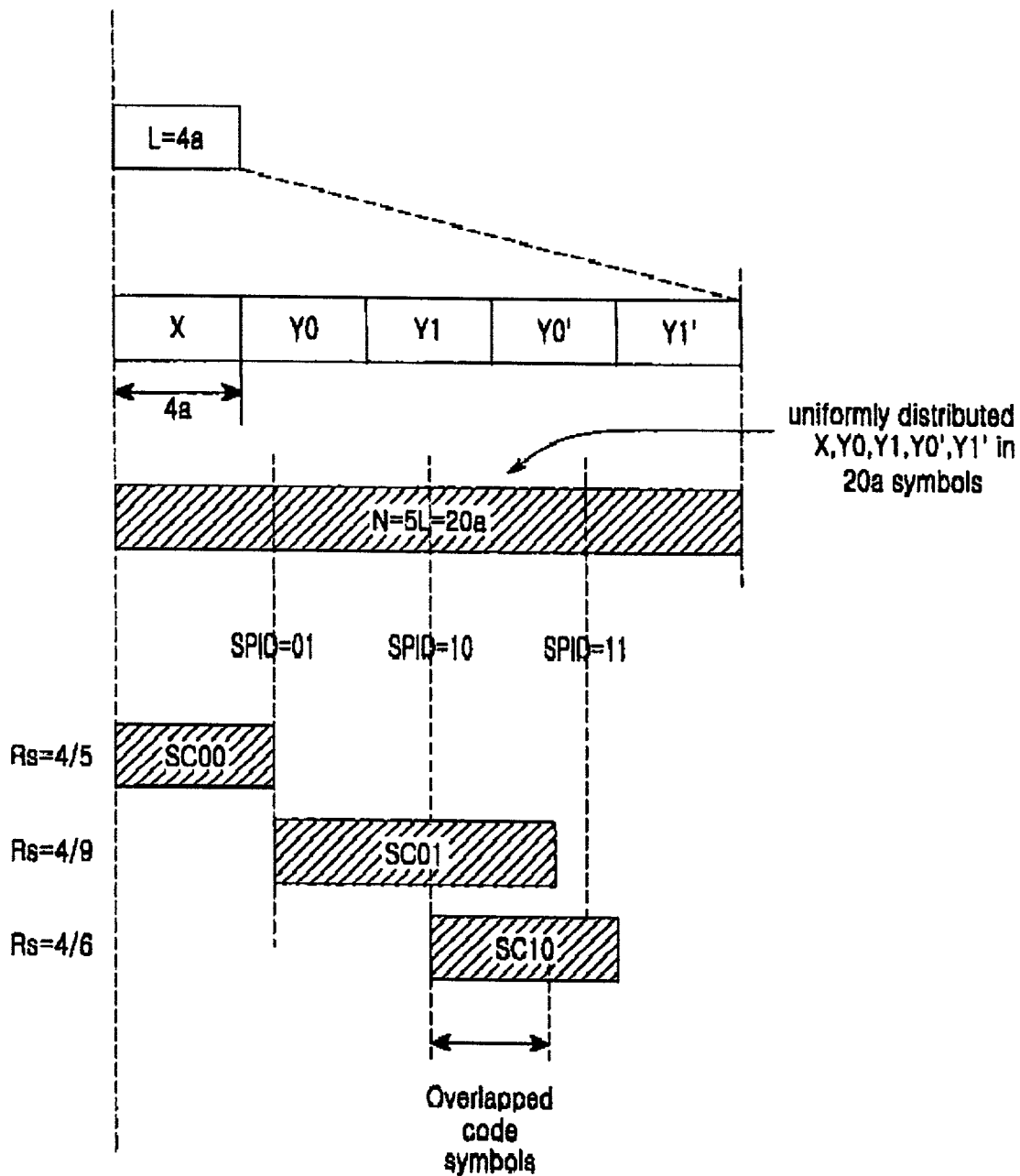
FIG. 6 is a diagram for explaining a symbol overlapping phenomenon occurring when the QCTC generating apparatus of FIG. 1 generates sub-codes in the FSPM mode.

The FSPM has the following problems in decoding. First, as shown in FIG. 3 in SC00, there exist missing (i.e., unused) coded symbols when a code rate of the sub-codes is higher than 0.8. Second, as shown in FIG. 4, there exist overlapped coded symbols among the sub-codes SC00, SC01 and SC10, when a code rate of the sub-codes is less than 0.8. This relation is illustrated in FIG. 6. As illustrated, when a code rate of the sub-codes is less than 0.8, there exist many overlapped coded symbols between the sub-code SC01 and the sub-code SC10.

For example, if the maximum sub-code rate Rs is 0.8 (=4/5), there exist no missing symbol caused by the first problem. That is, in all cases, there exits no missing symbol. In contrast, if the maximum sub-code rate Rs is very low, there exist many overlapped coded symbols between the sub-codes, and this means that the decoder performs soft symbol combining before decoding. Average energy Es of the coded symbols should be uniform in order to guarantee performance of the turbo decoder (Uniformity Property), and when the Es is not uniform, a periodic pattern in the regular form is required (Periodicity Property). However, an increase in number of the overlapped symbols makes it difficult to guarantee the property of the overlapped symbols, causing deterioration of decoding performance. In other words, the SSPM has more uniform property than the FSPM in terms of the average energy Es.

Figure 7:
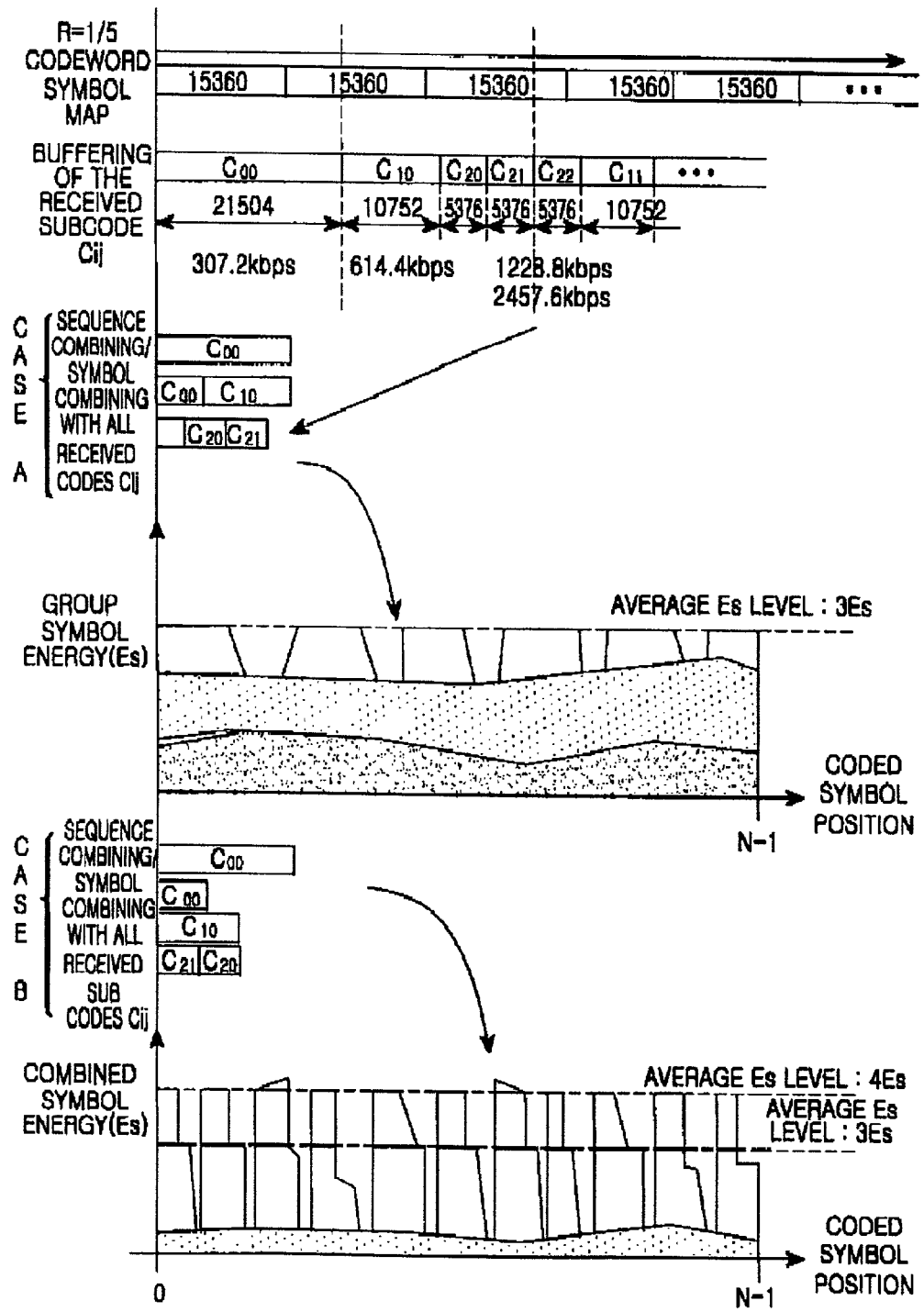
FIG. 7 illustrates decoding performances at a receiver when the QCTC generating apparatus of FIG. 1 operates in an SSPM mode and an FSPM mode.

FIG. 7 illustrates a difference between the SSPM (Case A) and the FSPM (Case B) used in the receiver. In FIG. 7, codeword repetition or sequence repetition is 2. In Case A, the sequential starting points show such energy (Es) distribution. That is, if the receiver performs soft symbol combining, the average energy Es is doubled. Alternatively, one part is tripled, and another part is doubled. However, in Case B, the fixed starting points do not show such energy distribution, and instead, show that an energy difference between the symbols may vary up to 9 dB. The non-uniform distribution of the symbol energy combined in the receiver has a direct effect on the decoding performance and causes deterioration of average performance. However, in the SSPM, as much Es increment as a sequence repetition factor is uniformly distributed over the whole coded symbols, and only the remaining repeated symbols have energy higher by +3 dB than Es and this energy is also uniformly distributed in the codeword. That is, that the SSPM guarantees optimal performance by the same sequence repetition. This reason will be described with reference to FIG. 8.

Figure 8:
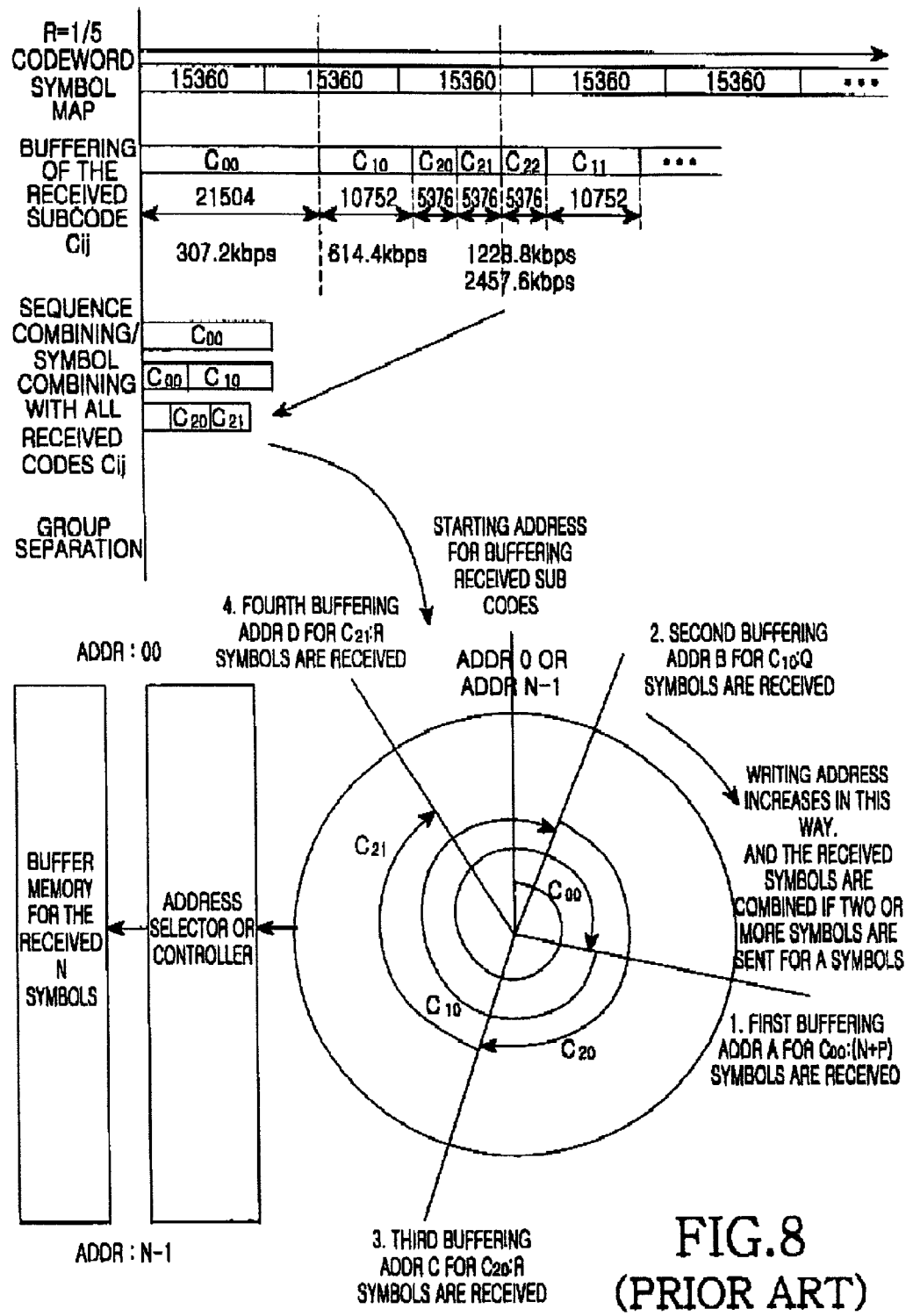
FIG. 8 illustrates an operation of a receiver for decoding sub-codes generated by the QCTC generating apparatus of FIG. 1 from a point of address generation.

Referring to FIG. 8, the receiver uses N buffers (or an N×Q-bit buffer). The buffers may be realized with a circular buffer. Alternatively, a memory space for the buffers may be designed such that a buffer address generator with a fixed size can generate circular addresses. As illustrated in FIG. 8, for C00, the receiver stores N symbols beginning at a starting address ADDR0, and from that position, stores 6144 (=21504−15360) symbols in the buffer. Since this is a step of storing the symbols after the first N symbols, the receiver soft combines the currently stored symbols with the previously stored symbols in the above-stated manner, and stores the soft-combined symbols. Here, an address where the soft combining is ended is called "ADDR A". Next, when C10 is received in the same way, the receiver stores received symbols in the buffer while progressing by 10752 symbols from "ADDR A". Since this is also a step of storing the symbols after the first N symbols, the receiver soft combines the currently stored symbols with the previously stored symbols in the above-stated manner, and stores the soft-combined symbols. Here, an address where the soft combining is ended is called "ADDR B". Next, when C20 is received in the same way, the receiver stores received symbols in the buffer while progressing by 5376 symbols from "ADDR B". Here, an address where the soft combining is ended is called "ADDR C". Next, when C21 is received in the same way, the receiver stores received symbols in the buffer while progressing by 5376 symbols from "ADDR C".

Here, an address where the soft combining is ended is called "ADDR D". The receiver finally generates soft metrics for a total of N codeword symbols by continuously performing soft combining on the sub-codes transmitted by one encoding packet in the above manner. Also, this method can be regarded as a method of realizing the sub-code generation scheme for the QCTCs in the transmitter. Summarizing, this method is identical to a method of realizing Step 1 of determining the length of an initial sub-code, Step 2 of selecting and transmitting a sub-code for initial transmission, Step 3 of determining the starting position of a sub-code for the next transmission and the length of the sub-code, and Step 4 of selecting and transmitting a sub-code for the next transmission. Therefore, the receiver can perform soft combining while equally mapping the sub-codes to the codewords with R=1/5 according to sub-code type information transmitted by the transmitter in the circular buffering method. Since the received symbols stored in the circular buffer are regularly accumulated, the sequential starting points have the uniformly combined Es as described in conjunction with FIG. 7.

Figure 9:
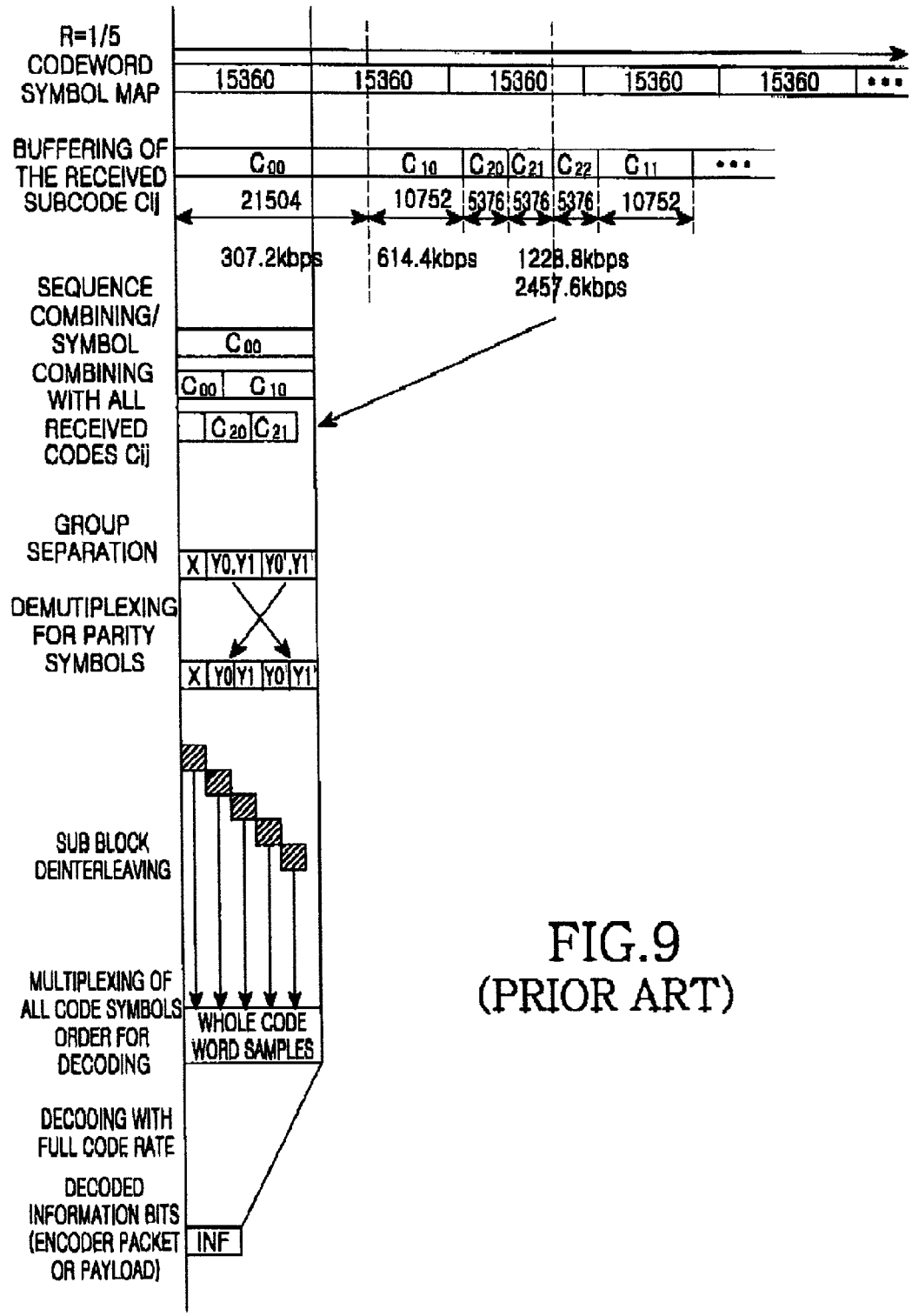
FIG. 9 illustrates an operation of the receiver for decoding sub-codes generated by the QCTC generating apparatus of FIG. 1.

FIG. 9 illustrates a block diagram of a scheme for performing decoding in the SSPM according to the present invention. As illustrated, it is assumed that the sub-codes transmitted up to now by the transmitter are C00, C10, C20 and C21. That is, C00 represents a transmitted sub-code having 21504 codeword symbols, C10 represents a transmitted sub-code having 10752 codeword symbols, and C20 and C21 represent transmitted sub-codes each having 5376 codeword symbols. Therefore, up to the present, the receiver has received a total of four sub-codes, and all of these were transmitted as sub-codes having different sub-code rates by an encoding packet (3072 bits were used herein for it by way of example), which is one information block. Therefore, the receiver generates soft metrics for the N codewords by soft combining the sub-codes in the above-stated manner. The receiver performs soft combining by rearranging the four sub-codes such that the positions of 15360 (=3072×5) codeword symbols of a codeword with R=1/5 should be identical to the positions of codeword symbols of the respective sub-codes. Since a length, 21504, of the sub-code C00 is larger than N, the receiver arranges 15360 symbols and then sequentially arranges the remaining 6144 (=21504−15360) codeword symbols from the beginning as in the sequence repetition method, and performs soft symbol combining on the arranged codeword symbols. Likewise, since C10 was transmitted following C00, the receiver also stores C10 following the end of C00, and then performs soft symbol combining on them. Likewise, since C20 and C21 were transmitted following the C10, the receiver stores C20 and C21 following the end of C10, and then performs soft symbol combining on the stored sub-codes.

B. EMBODIMENTS

SSPM Transmission

Figure 15:
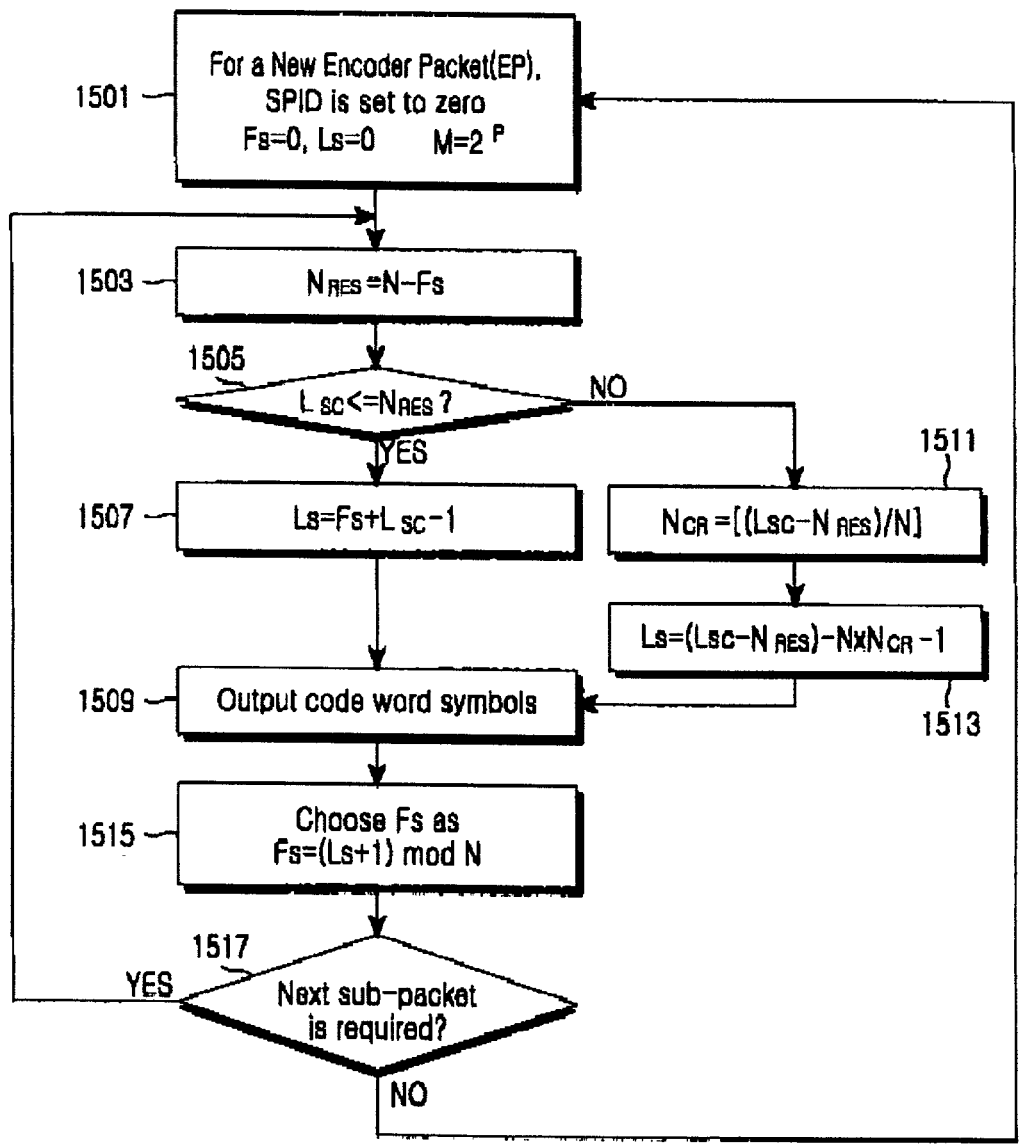
FIG. 15 illustrates a procedure for generating sub-codes in an SSPM (Sequential Starting Point Mode) mode according to an embodiment of the present invention.

FIG. 15 illustrates a transmission algorithm for the SSPM according to an embodiment of the present invention. In FIG. 15, Lsc represents a size of sub-packets, N represents the number of codeword symbols encoded by a turbo encoder with a code rate R, Fs represents a starting symbol position (or starting point) of each sub-packet, and Ls represents a last symbol position (or last point). Further, $N_{RES}$ represents a variable calculated by a given formula. In the following algorithm, '[x]' represents a maximum integer less than a given value 'x'. In addition, $N_{CR}$ represents a repetition frequency of the whole codeword comprised of N symbols.

Referring to FIG. 15, a sub-code generator resets a starting point Fs to zero (0) for a new encoder packet in step 1501. If there is a previously transmitted sub-code, the sub-code generator uses Ls determined from a previously transmitted sub-packet as Fs. Thereafter, in step 1503, the sub-code generator calculates the number $N_{RES}$ of the remaining symbols by subtracting the determined starting point Fs from the number N of the codeword symbols. The sub-code generator determines in step 1505 whether the calculated number $N_{RES}$ of the remaining symbols is greater than or equal to a length Lsc of a current transmission sub-code (or sub-packet). If the number $N_{RES}$ of the remaining symbols is larger than or equal to the length Lsc of the sub-code, the sub-code generator updates a last point Ls of the sub-code to 'Fs+Lsc−1' in step 1507. Thereafter, in step 1509, the sub-code generator sequentially transmits coded symbols from the determined starting point Fs to the determined last point Ls. However, if the number $N_{RES}$ of the remaining symbols is less than the length Lsc of the sub-code, the sub-code generator determines the last point Ls of the sub-code as follows in steps 1511 and 1513 as shown by equations (2) and (3).

$$N_{CR}=[(Lsc-N_{RES})/N] \qquad (2)$$

$$Ls=(Lsc-N_{RES})-N \times N_{CR}-1 \qquad (3)$$

After the step 1507 or 1513, the sub-code generator sequentially transmits symbols from the starting point Fs to the $(N-1)^{th}$ symbol point in step 1509. Next, the sub-code generator repeats all of the N symbols as many times as $N_{CR}$ for transmission. Lastly, the sub-code generator transmits symbols from the $0^{th}$ symbol position to the $Ls^{th}$ symbol position, and then proceeds to step 1515. After transmitting the symbols corresponding to the sub-code, the sub-code generator updates the starting point Fs to '(Ls+1) mod N' in step 1515. The sub-code generator determines in step 1517 whether a next sub-packet (or retransmission) is requested. If transmission of the next sub-packet is requested, the sub-code generator returns to step 1503 and repeats the above steps. Otherwise, the sub-code generator returns to step 1501.

As stated above, the disadvantage of the FSPM lies in that there exist many overlapped symbols, and the overlapped symbols cause performance degradation of the decoder. Accordingly, there is a demand for a method of minimizing the number of the overlapped symbols.

First Embodiment of FSPM Transmission

In the FSPM, SPIDs must be transmitted either sequentially or in a predetermined order. This is to improve error detection capability of preamble and decrease a false alarm rate (FAR). That is, the SPIDs must be transmitted sequentially. If the SPIDs are transmitted irregularly, it is not possible to detect an error of the SPIDs without using CRC. Two examples are given below. In Case 2, there is no way to detect an error of the SPIDs, so it should depend on error detection over the whole transmission preamble including the SPIDs. Therefore, if it is assumed that a system using a forward secondary packet data control channel (F-SPD-CCH) transmits the SPIDs without using CRC, the SPIDs must be assigned either sequentially or in a predetermined order.

Case 1) Sequential SPIDs: 0→1→2→3→0→1→2→3→0...
Case 2) Random SPIDs: 0→3→1→2→1→0→3→2→1...

In designing Case 1 and Case 2, importance is placed on error detection rather than symbol overlapping problem.

Figure 10:
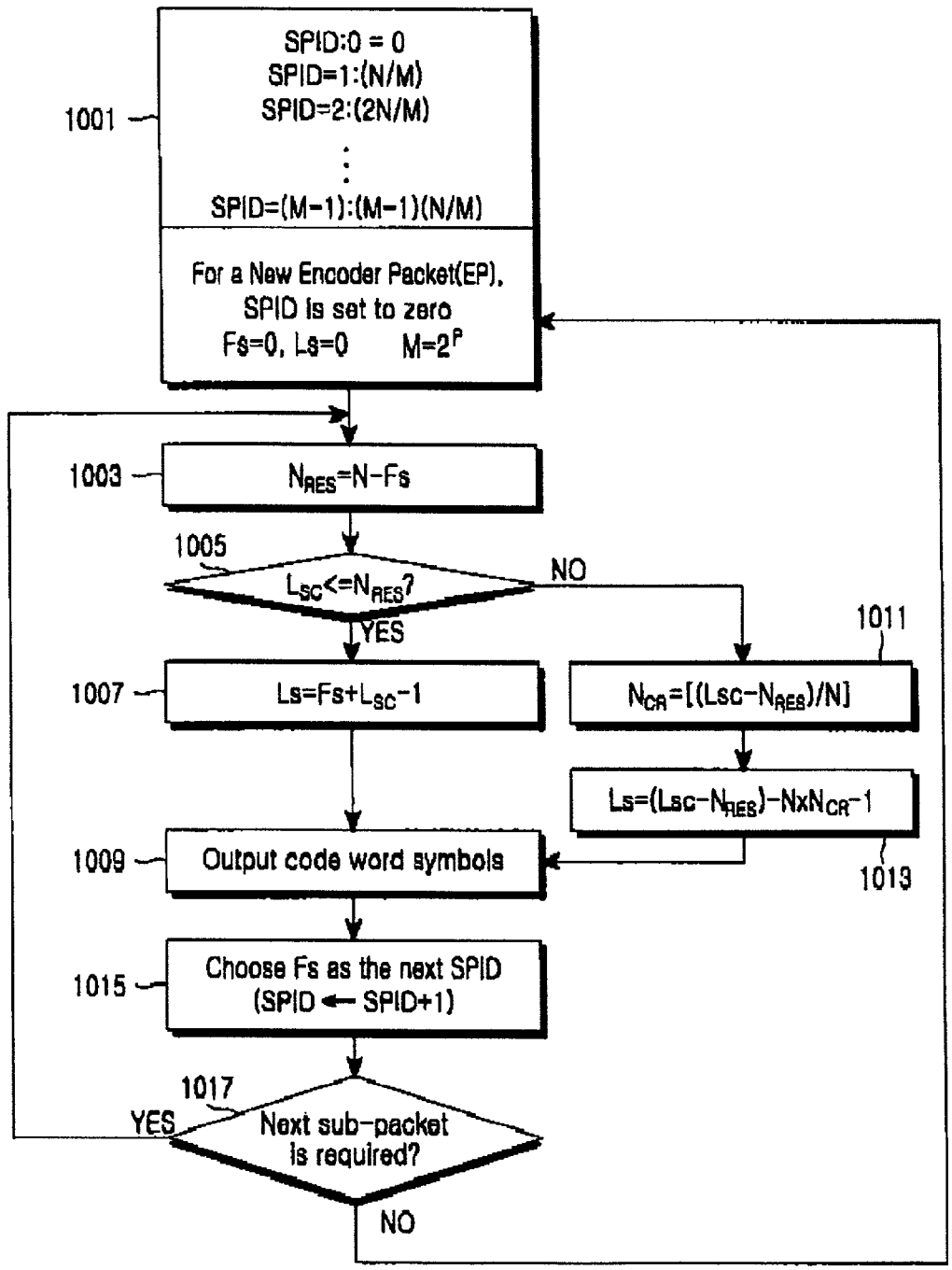
FIG. 10 illustrates an SPID selection procedure according to a first embodiment of the present invention.

FIG. 10 illustrates an SPID selection procedure according to a first embodiment of the present invention. In FIG. 10, P represents the number of bits assigned to the SPID, and M represents a maximum integer expressed with P bits. That is, if P=2, then M=4. Further, N represents the number of coded symbols encoded with a mother code. For example, when a code rate is R=1/5 and a length of input information is L=100, the number of coded symbols encoded with the mother code becomes N=L/R=500. In addition, Lsc represents a size of sub-packets, Fs represents a starting symbol position (or starting point) of each sub-packet, and Ls represents a last symbol position (or last point) of each sub-packet. $N_{RES}$ is a variable calculated by a given formula. In the following algorithm, '[x]' represents a maximum integer less than a value 'x'. $N_{CR}$ represents a repetition frequency of the whole codeword comprised of N symbols. This procedure is performed by the sub-code generator in the QCTC generation apparatus of FIG. 1.

Referring to FIG. 10, in step 1001, the sub-code generator initializes an SPID to zero (0) for a new encoder packet (EP). Further, the sub-code generator initializes the starting point Fs and the last point Ls of the sub-code. The SPID and the starting point Fs are in the relation of $$SIPD = 1 : (N/M)$$
$$SIPD = 2 : (2N/M)$$
$$SIPD = 3 : (3N/M)$$
$$\vdots$$
$$SIPD = (M-1) : (M-1)(N/M)$$

In step 1003, the sub-code generator calculates the number $N_{RES}$ of the remaining symbols by subtracting the determined starting point Fs from the number N of the codeword symbols. The sub-code generator determines in step 1005 whether the calculated number $N_{RES}$ of the remaining symbols is greater than or equal to the length Lsc of the current transmission sub-code (or sub-packet). If the number $N_{RES}$ of the remaining symbols is greater than or equal to the length Lsc of the sub-code, the sub-code generator updates the last point Ls of the sub-code to 'Fs+Lsc−1' in step 1007. In step 1009, the sub-code generator sequentially transmits coded symbols from the starting point Fs to the determined last point Ls, and then proceeds to step 1015. In contrast, if the number $N_{RES}$ of the remaining symbols is less than the length Lsc of the sub-code, the sub-code generator determines the last point Ls of the sub-code as follows and defined again by equations (2) and (3) in steps 1011 and 1013.

$$N_{CR}=[(Lsc-N_{RES})/N] \quad (2)$$

$$Ls=(Lsc-N_{RES})-N \times N_{CR}-1 \quad (3)$$

After the step 1007 or 1013, the sub-code generator sequentially transmits symbols from the starting point Fs to the $(N-1)^{th}$ symbol position in step 1009. Next, the sub-code generator repeats all of the N symbols as many times as $N_{CR}$ before transmission. Lastly, the sub-code generator transmits symbols from the $0^{th}$ symbol position to the $Ls^{th}$ symbol position, and then proceeds to step 1015. After transmitting the symbols corresponding to the sub-code, the sub-code generator chooses the next one of the determined SPIDs as the starting point Fs of the next sub-packet in step 1015. The sub-code generator determines in step 1017 whether a next sub-packet (or retransmission) is requested. Here, "the next packet is requested" means that retransmission of the current encoder packet (EP) transmitted by the transmitter is requested due to failure to receive the encoder packet. Thus, the SPID should not be reset, and it should be connected to the next SPID. Therefore, if transmission of the next sub-packet is requested, the sub-code generator returns to step 1003 and repeats the above steps. Otherwise, if transmission of the next sub-packet is not requested, it means that the SPID should be reset. In this case, since the currently transmitted EP is successfully received and thus transmission of a new EP is requested, the sub-code generator returns to step 1001.

Second Embodiment of FSPM Transmission

Figure 11:
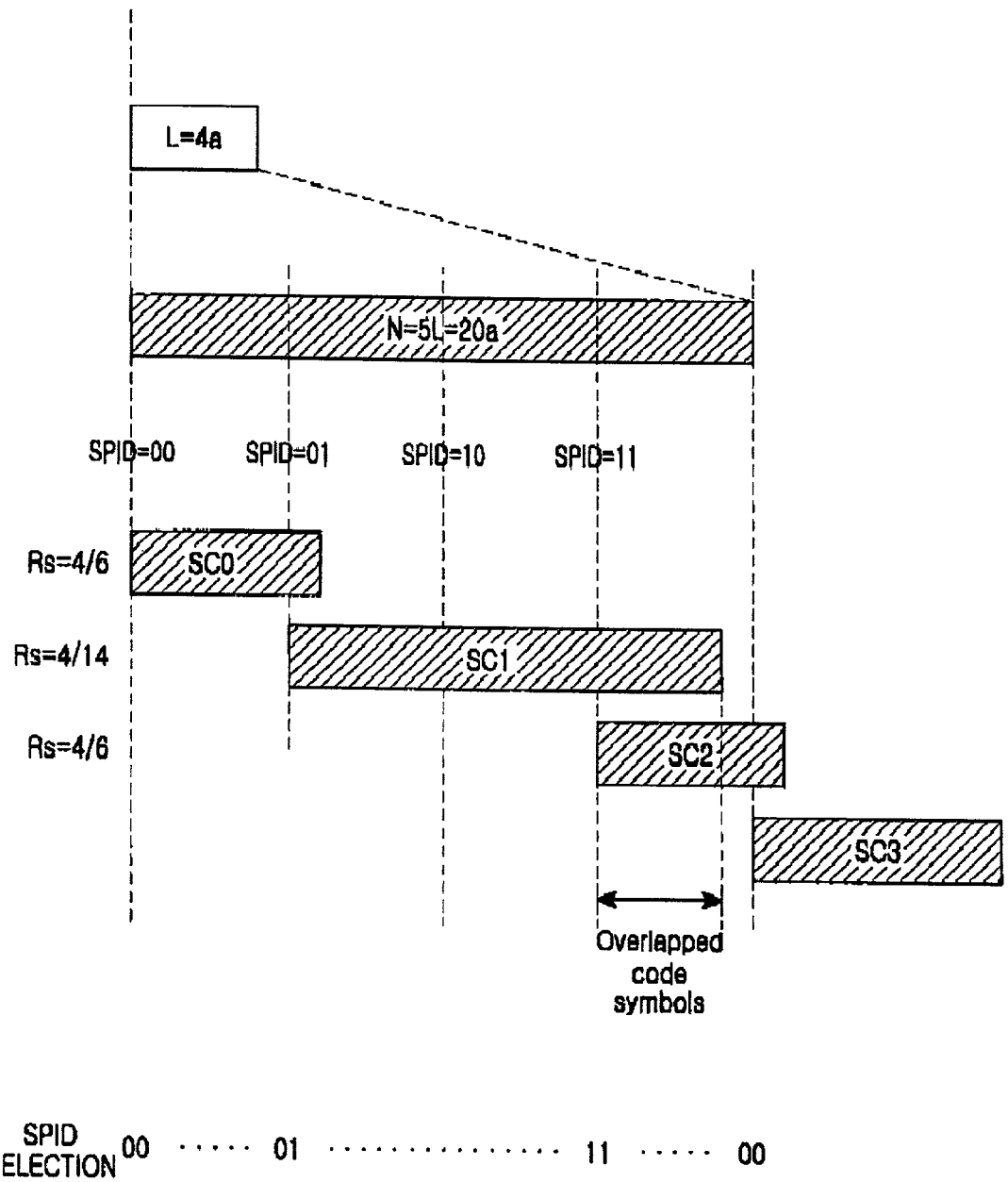
FIG. 11 illustrates a procedure for generating sub-codes in the FSPM mode according to a second embodiment of the present invention.

If CRC is used in an SPID transmission message (i.e., CRC is used in F-SPDCCH), an error detection function is provided. In this case, therefore, an order of the SPIDs in the FSPM need not be sequential. Alternatively, if the error detection function is not strongly required in the SPID transmission message, an order of the SPIDs in the FSPM need not be sequential. In this case, it is preferable to select the next transmission sub-code according to the following rule in order to reduce the number of overlapped symbols for optimization of decoding performance. This is because for the maximum code rate 0.8 of the sub-code, if a sub-code rate is less than 0.8 due to the SPID that divides the coded symbols with R=1/5 into four equal parts, symbol overlapping inevitably occurs. Therefore, after transmission of one sub-code, an optimal method minimizes the number of punctured symbols, i.e., symbols pruned instead of being transmitted at transmission of two sub-codes. Accordingly, there is a demand for a method of minimizing the number of overlapped symbols. That is, a starting point Fs of the next sub-packet is determined as a value less than or equal to the last point Ls of the previous sub-packet among the SPID nearest to the last point Ls of the previous sub-packet (or sub-code). When the starting point Fs is selected in this manner, the sub-packets are transmitted as illustrated in FIG. 11. As illustrated, after transmitting a sub-packet SC1, the sub-code generator selects the nearest SPID=11 among the SPIDs (SPID=00, SPID=01, SPID=10) less than or equal to the last point of the sub-packet SC1, and then transmits the next sub-packet SC2 beginning at the starting point.

Figure 12:
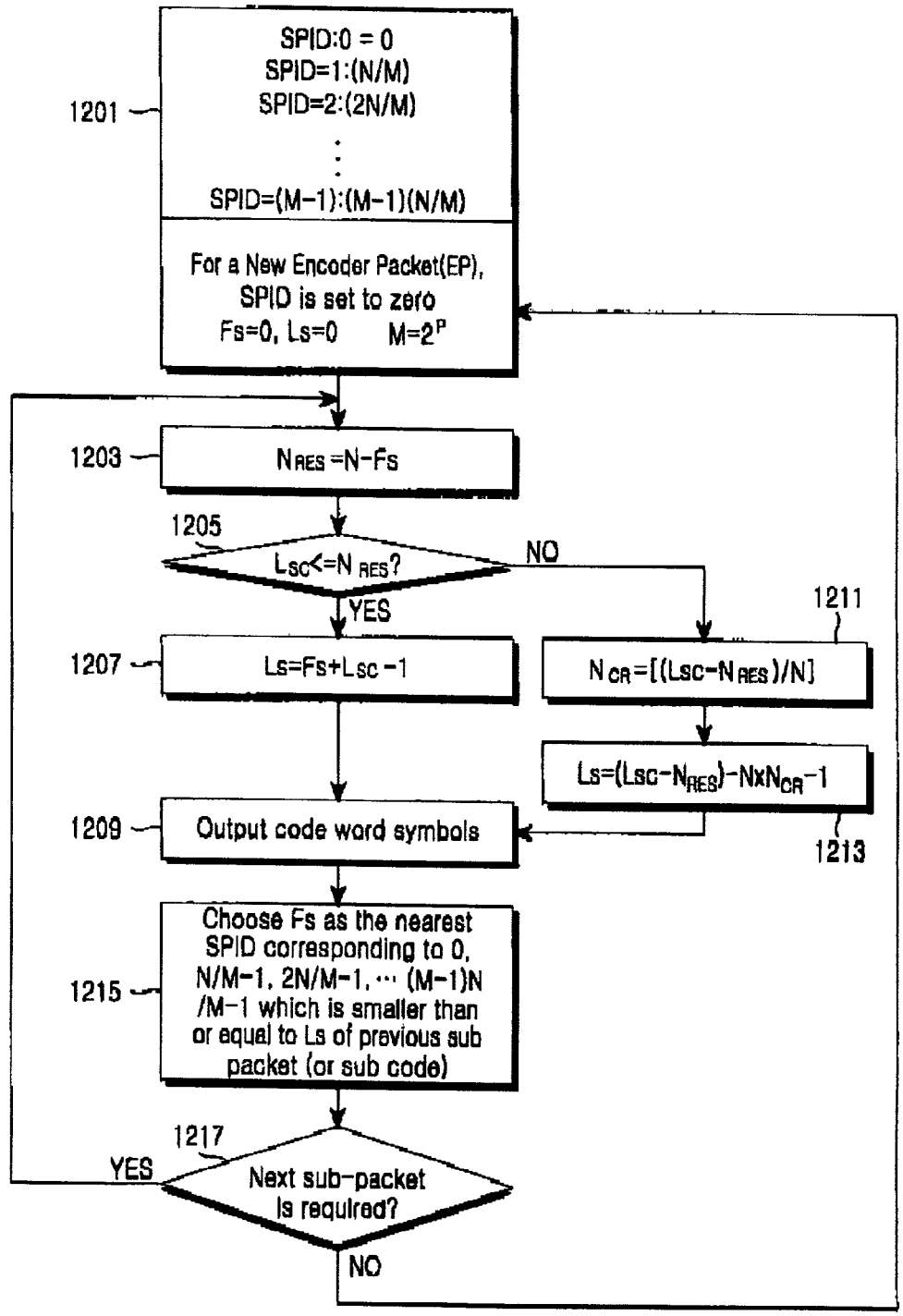
FIG. 12 illustrates an SPID selection procedure according to the second embodiment of the present invention.

FIG. 12 illustrates an SPID selection procedure according to a second embodiment of the present invention. In FIG. 12, P represents the number of bits assigned to the SPID, and M represents a maximum integer expressed with P bits. That is, if P=2, then M=4. Further, N represents the number of coded symbols encoded with a mother code. For example, when a code rate is R=1/5 and a length of input information is L=100, the number of coded symbols encoded with the mother code becomes N=L/R=500. In addition, Lsc represents a size of sub-packets, Fs represents a starting symbol position (or starting point) of each sub-packet, and Ls represents a last symbol position (or last point) of each sub-packet. $N_{RES}$ is a variable calculated by a given formula. In the following algorithm, '[x]' represents a maximum integer less than a value 'x'. $N_{CR}$ represents a repetition frequency of the whole codeword comprised of N symbols. Meanwhile, the last symbol position Ls can be differently determined according to an algorithm in used. For example, it is also possible to use a method of determining the number of symbols according to a given sub-code rate, perform sequence repetition by comparing the determined number with N, and determine the last symbol position Ls by the number of the remaining symbols, as in the above-stated sequential transmission method.

Referring to FIG. 12, in step 1201, the sub-code generator initializes an SPID to zero (0) for a new encoder packet (EP). Further, the sub-code generator initializes the starting point Fs and the last point Ls of the sub-code. The SPID and the starting point Fs are in the relation of $$SIPD = 1 : (N/M)$$
$$SIPD = 2 : (2N/M)$$
$$SIPD = 3 : (3N/M)$$
$$\vdots$$
$$SIPD = (M-1) : (M-1)(N/M)$$

In step 1203, the sub-code generator calculates the number $N_{RES}$ of the remaining symbols by subtracting the determined starting point Fs from the number N of the codeword symbols. The sub-code generator determines in step 1205 whether the calculated number $N_{RES}$ of the remaining symbols is larger than or equal to the length Lsc of the current transmission sub-code (or sub-packet). If the number $N_{RES}$ of the remaining symbols is larger than or equal to the length Lsc of the sub-code, the sub-code generator updates the last point Ls of the sub-code to 'Fs+Lsc−1' in step 1207. In step 1209, the sub-code generator sequentially transmits coded symbols from the starting point Fs to the determined last point Ls, and then proceeds to step 1215. In contrast, if the number $N_{RES}$ of the remaining symbols is less than the length Lsc of the sub-code, the sub-code generator determines the last point Ls of the sub-code as follows and defined again by equations (2) and (3) in steps 1211 and 1213.

$$N_{CR}=[(Lsc-N_{RES})/N] \quad (2)$$

$$Ls=(Lsc-N_{RES})-N \times N_{CR}-1 \quad (3)$$

After the step 1207 or 1213, the sub-code generator sequentially transmits symbols from the starting point Fs to the (N−1)$^{th}$ symbol position in step 1209. Next, the sub-code generator repeats all of the N symbols as many times as $N_{CR}$ before transmission. Lastly, the sub-code generator transmits symbols from the 0$^{th}$ symbol position to the Ls$^{th}$ symbol position, and then proceeds to step 1215. After transmitting the symbols corresponding to the sub-code, the sub-code generator chooses the starting point Fs from the determined SPIDs in step 1215. Here, the sub-code generator chooses, as the starting point Fs of the next sub-packet, a value less than or equal to the last point Ls of the previous sub-packet among the SPID nearest to the last point Ls of the previous sub-packet (or sub-code). The sub-code generator determines in step 1217 whether a next sub-packet (or retransmission) is requested. Here, "the next packet is requested" means that retransmission of the current encoder packet (EP) transmitted by the transmitter is requested due to failure to receive the encoder packet. Thus, the SPID should not be reset, and it should be connected to the next SPID. Therefore, if transmission of the next sub-packet is requested, the sub-code generator returns to step 1203 and repeats the above steps. Otherwise, if transmission of the next sub-packet is not requested, it means that the SPID should be actually reset. In this case, since the currently transmitted EP is successfully received and thus transmission of a new EP is requested, the sub-code generator returns to step 1201.

Third Embodiment of FSPM Transmission

Figure 13:
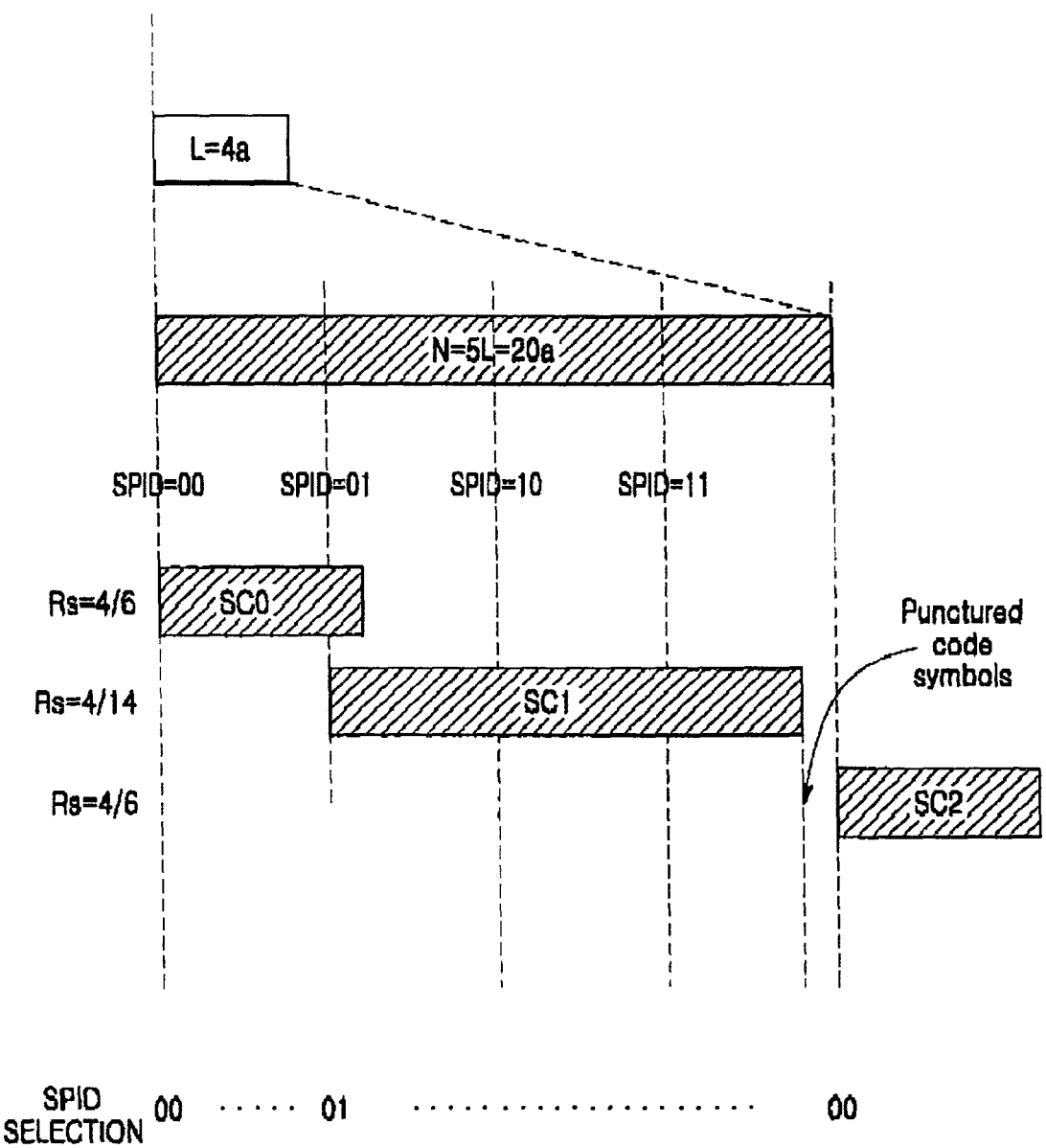
FIG. 13 illustrates a procedure for generating sub-codes in the FSPM mode according to a third embodiment of the present invention.

The invention provides another method for choosing a starting point of the next sub-code as an SPID nearest to the Ls of the previous sub-code after transmitting one sub-code. That is, the nearest one of the SPIDs greater than or equal to the last point Ls of the previous sub-packet is determined as Fs. This method needs symbol puncturing, but limits the maximum number of overlapped symbols to N/8 (=(N/4)/2). Likewise, the number of punctured symbols is also limited to N/8 (=(N/4)/2). Of course, there is trade-off between a gain caused by the reduction in number of the overlapped symbols and a loss caused by the increase in number of the punctured symbols. That is, for the next sub-packet (or sub-code), the sub-code generator chooses the nearest SPID (or Fs) from the last point Ls of the previous sub-packet (or sub-code). When the starting point Fs is selected in this manner, the sub-packets are transmitted as illustrated in FIG. 13. As illustrated, after transmitting a sub-packet SC1, the sub-code generator selects the nearest SPID=00 from the last point Ls of the sub-packet SC1, and then transmits the next sub-packet SC2 beginning at the starting point. In this case, there exist punctured symbols between the sub-packet SC1 and the sub-packet SC2.

Figure 14:
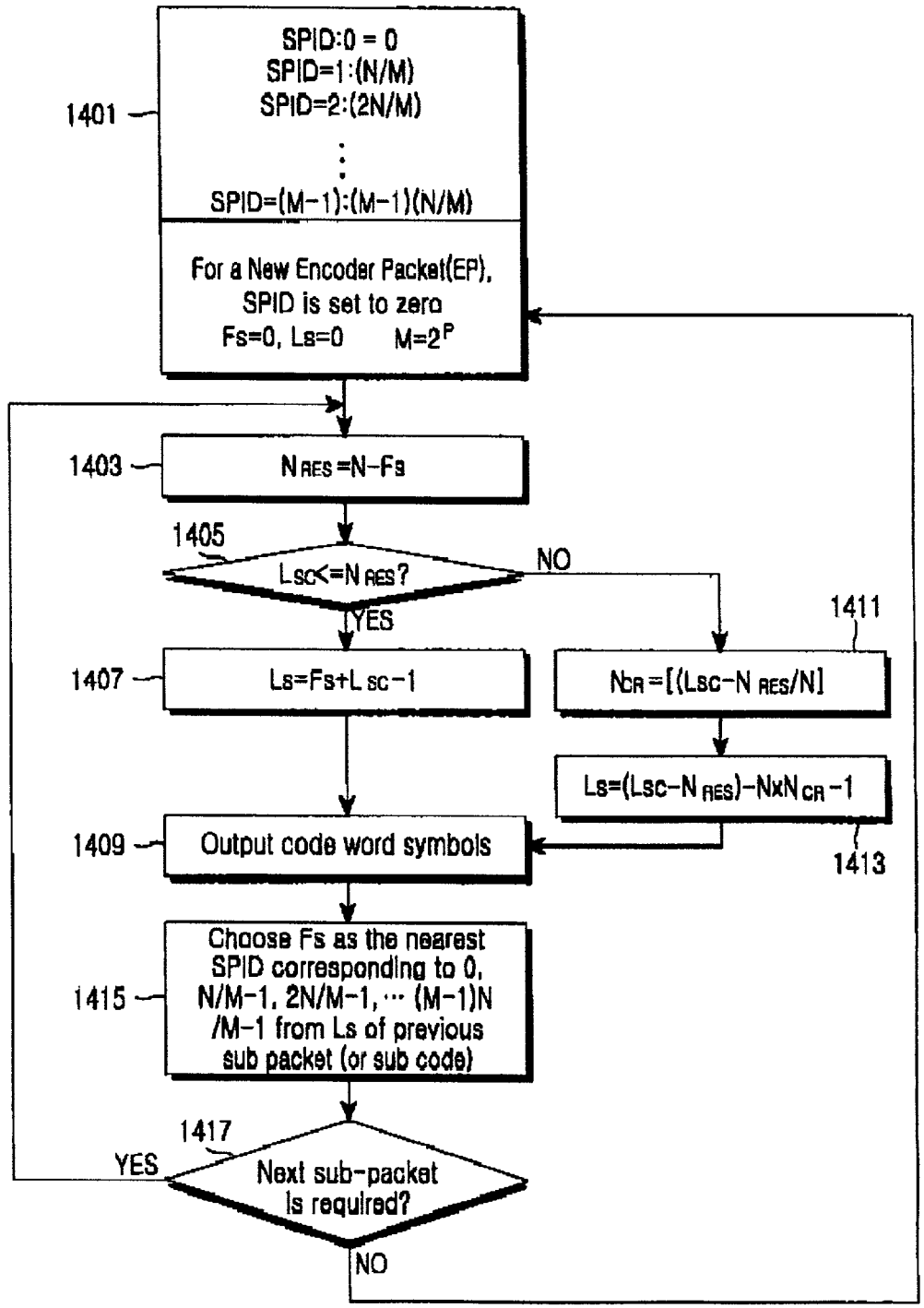
FIG. 14 illustrates an SPID selection procedure according to the third embodiment of the present invention.

FIG. 14 illustrates an SPID selection procedure according to a third embodiment of the present invention. In FIG. 14, P represents the number of bits assigned to the SPID, and M represents a maximum integer expressed with P bits. That is, if P=2, then M=4. Further, N represents the number of coded symbols encoded with a mother code. For example, when a code rate is R=1/5 and a length of input information is L=100, the number of coded symbols encoded with the mother code becomes N=L/R=500. In addition, Lsc represents a size of sub-packets, Fs represents a starting symbol position (or starting point) of each sub-packet, and Ls represents a last symbol position (or last point) of each sub-packet. $N_{RES}$ is a variable calculated by a given formula. In the following algorithm, '[x]' represents a maximum integer less than a value 'x'. $N_{CR}$ represents a repetition frequency of the whole codeword comprised of N symbols. Meanwhile, the last symbol position Ls can be differently determined according to an algorithm in used.

Referring to FIG. 14, in step 1401, the sub-code generator initializes an SPID to zero (0) for a new encoder packet (EP). Further, the sub-code generator initializes the starting point Fs and the last point Ls of the sub-code. The SPID and the starting point Fs are in the relation of $$SIPD = 1 : (N/M)$$
$$SIPD = 2 : (2N/M)$$
$$SIPD = 3 : (3N/M)$$
$$\vdots$$
$$SIPD = (M-1) : (M-1)(N/M)$$

In step 1403, the sub-code generator calculates the number $N_{RES}$ of the remaining symbols by subtracting the determined starting point Fs from the number N of the codeword symbols. The sub-code generator determines in step 1405 whether the calculated number $N_{RES}$ of the remaining symbols is larger than or equal to the length Lsc of the current transmission sub-code (or sub-packet). If the number $N_{RES}$ of the remaining symbols is larger than or equal to the length Lsc of the sub-code, the sub-code generator updates the last point Ls of the sub-code to 'Fs+Lsc−1' in step 1407. In step 1409, the sub-code generator sequentially transmits coded symbols from the starting point Fs to the determined last point Ls, and then proceeds to step 1415. In contrast, if the number $N_{RES}$ of the remaining symbols is less than the length Lsc of the sub-code, the sub-code generator determines the last point Ls of the sub-code as follows and again in accordance with equations (2) and (3) in steps 1411 and 1413.

$$N_{CR}=[(Lsc-N_{RES})/N] \quad (2)$$

$$Ls=(Lsc-N_{RES})-N\times N_{CR}-1 \quad (3)$$

After the step 1407 or 1413, the sub-code generator sequentially transmits symbols from the starting point Fs to the $(N-1)^{th}$ symbol position in step 1409. Next, the sub-code generator repeats all of the N symbols as many times as $N_{CR}$ before transmission. Lastly, the sub-code generator transmits symbols from the $0^{th}$ symbol position to the $Ls^{th}$ symbol position, and then proceeds to step 1415. After transmitting the symbols corresponding to the sub-code, the sub-code generator chooses the starting point Fs from the determined SPIDs in step 1415. Here, the sub-code generator chooses, as the starting point Fs of the next sub-packet, a point corresponding to an SPID (or Fs) equal to or nearest to the last point Ls of the previous sub-packet (sub-code). The sub-code generator determines in step 1417 whether a next sub-packet (or retransmission) is requested. Here, "the next packet is requested" means that retransmission of the current encoder packet (EP) transmitted by the transmitter is requested due to failure to receive the encoder packet. Thus, the SPID should not be reset, and it should be connected to the next SPID. Therefore, if transmission of the next sub-packet is requested, the sub-code generator returns to step 1403 and repeats the above steps. Otherwise, if transmission of the next sub-packet is not requested, it means that the SPID should be reset. In this case, since the currently transmitted EP is successfully received and thus transmission of a new EP is requested, the sub-code generator returns to step 1401.

The invention provides another method applied when the second and third embodiments use a specific SPID for initial transmission. In this case, the methods proposed in the second and third embodiments are equally applied, but the specific SPID for initial transmission cannot be used during retransmission. For example, when SPID=0 is previously determined as an SPID for initial transmission, SPIDs available for retransmission are 1, 2, 3, . . . , (M−1)(N/M). Thus, the sub-code generator selects the SPIDs used for retransmission according to the selection algorithm of the second and third embodiments. FIGS. 16 and 17 illustrate modifications of the second and third embodiments for the case where the SPID=0 is used for initial transmission. Herein, SPID=0 is used for initial transmission by way of example. When necessary, another SPID can be used for initial transmission.

Fourth Embodiment of FSPM Transmission

FIG. 16 illustrates an SPID selection procedure according to a fourth embodiment of the present invention. In particular, FIG. 16 illustrates a modification of the SPID selection procedure according to the second embodiment. In FIG. 16, P represents the number of bits assigned to the SPID, and M represents a maximum integer expressed with P bits. That is, if P=2, then M=4. Further, N represents the number of coded symbols encoded with a mother code. For example, when a code rate is R=1/5 and a length of input information is L=100, the number of coded symbols encoded with the mother code becomes N=L/R=500. In addition, Lsc represents a size of sub-packets, Fs represents a starting symbol position (or starting point) of each sub-packet, and Ls represents a last symbol position (or last point) of each sub-packet. $N_{RES}$ is a variable calculated by a given formula. In the following algorithm, '[x]' represents a maximum integer less than a value 'x'. $N_{CR}$ represents a repetition frequency of the whole codeword comprised of N symbols. Meanwhile, the last symbol position Ls can be differently determined according to an algorithm in used. For example, it is also possible to use a method of determining the number of symbols according to a given sub-code rate, perform sequence repetition by comparing the determined number with N, and determine the last symbol position Ls by the number of the remaining symbols, as in the above-stated sequential transmission method.

Referring to FIG. 16, in step 1601, the sub-code generator initializes an SPID to zero (0) for a new encoder packet (EP). Further, the sub-code generator initializes the starting point Fs and the last point Ls of the sub-code. The SPID and the starting point Fs are in the relation of $$SIPD = 1 : (N/M)$$

$$SIPD = 2 : (2N/M)$$

$$SIPD = 3 : (3N/M)$$

$$\vdots$$

$$SIPD = (M-1) : (M-1)(N/M)$$

In step 1603, the sub-code generator calculates the number $N_{RES}$ of the remaining symbols by subtracting the determined starting point Fs from the number N of the codeword symbols. The sub-code generator determines in step 1605 whether the calculated number $N_{RES}$ of the remaining symbols is larger than or equal to the length Lsc of the current transmission sub-code (or sub-packet). If the number $N_{RES}$ of the remaining symbols is larger than or equal to the length Lsc of the sub-code, the sub-code generator updates the last point Ls of the sub-code to 'Fs+Lsc−1' in step 1607. In step 1609, the sub-code generator sequentially transmits coded symbols from the starting point Fs to the determined last point Ls, and then proceeds to step 1615. In contrast, if the number $N_{RES}$ of the remaining symbols is less than the length Lsc of the sub-code, the sub-code generator determines the last point Ls of the sub-code as follows and in accordance with equations (2) and (3) in steps 1611 and 1613.

$$N_{CR}=[(Lsc-N_{RES})/N] \quad (2)$$

$$Ls=(Lsc-N_{RES})-N\times N_{CR}-1 \quad (3)$$

After the step 1607 or 1613, the sub-code generator sequentially transmits symbols from the starting point Fs to the $(N-1)^{th}$ symbol position in step 1609. Next, the sub-code generator repeats all of the N symbols as many times as $N_{CR}$ before transmission. Lastly, the sub-code generator transmits symbols from the $0^{th}$ symbol position to the $Ls^{th}$ symbol position, and then proceeds to step 1615. After transmitting the symbols corresponding to the sub-code, the sub-code generator chooses the starting point Fs from the determined SPIDs in step 1615. Here, the sub-code generator chooses, as the starting point Fs of the next sub-packet, a non-zero value out of the values less than or equal to the last point Ls of the previous sub-packet among the SPID nearest to the last point Ls of the previous sub-packet (or sub-code). That is, the sub-code generator excludes the SPID allocated for initial transmission from retransmission. The sub-code generator determines in step 1617 whether a next sub-packet (or retransmission) is requested. Here, "the next packet is requested" means that retransmission of the current encoder packet (EP) transmitted by the transmitter is requested due to failure to receive the encoder packet. Thus, the SPID should not be reset, and it should be connected to the next SPID. Therefore, if transmission of the next sub-packet is requested, the sub-code generator returns to step 1603 and repeats the above steps. Otherwise, if transmission of the next sub-packet is not requested, it means that the SPID should be actually reset. In this case, since the currently transmitted EP is successfully received and thus transmission of a new EP is requested, the sub-code generator returns to step 1601.

Fifth Embodiment of FSPM Transmission

FIG. 17 illustrates an SPID selection procedure according to a fifth embodiment of the present invention. In particular, FIG. 17 illustrates a modification of the SPID selection procedure according to the third embodiment. In FIG. 17, P represents the number of bits assigned to the SPID, and M represents a maximum integer expressed with P bits. That is, if P=2, then M=4. Further, N represents the number of coded symbols encoded with a mother code. For example, when a code rate is R=1/5 and a length of input information is L=100, the number of coded symbols encoded with the mother code becomes N=L/R=500. In addition, Lsc represents a size of sub-packets, Fs represents a starting symbol position (or starting point) of each sub-packet, and Ls represents a last symbol position (or last point) of each sub-packet. $N_{RES}$ is a variable calculated by a given formula. In the following algorithm, '[x]' represents a maximum integer less than a value 'x'. $N_{CR}$ represents a repetition frequency of the whole codeword comprised of N symbols. Meanwhile, the last symbol position Ls can be differently determined according to an algorithm in used. For example, it is also possible to use a method of determining the number of symbols according to a given sub-code rate, perform sequence repetition by comparing the determined number with N, and determine the last symbol position Ls by the number of the remaining symbols, as in the above-stated sequential transmission method.

Referring to FIG. 17, in step 1701, the sub-code generator initializes an SPID to zero (0) for a new encoder packet (EP). Further, the sub-code generator initializes the starting point Fs and the last point Ls of the sub-code. The SPID and the starting point Fs are in the relation of $$SIPD = 1 : (N/M)$$
$$SIPD = 2 : (2N/M)$$
$$SIPD = 3 : (3N/M)$$
$$\vdots$$
$$SIPD = (M-1) : (M-1)(N/M)$$

In step 1703, the sub-code generator calculates the number $N_{RES}$ of the remaining symbols by subtracting the determined starting point Fs from the number N of the codeword symbols. The sub-code generator determines in step 1705 whether the calculated number $N_{RES}$ of the remaining symbols is larger than or equal to the length Lsc of the current transmission sub-code (or sub-packet). If the number $N_{RES}$ of the remaining symbols is larger than or equal to the length Lsc of the sub-code, the sub-code generator updates the last point Ls of the sub-code to 'Fs+Lsc−1' in step 1707. In step 1709, the sub-code generator sequentially transmits coded symbols from the starting point Fs to the determined last point Ls, and then proceeds to step 1715. In contrast, if the number $N_{RES}$ of the remaining symbols is less than the length Lsc of the sub-code, the sub-code generator determines the last point Ls of the sub-code as follows in accordance with equations (2) and (3) in steps 1711 and 1713.

$$N_{CR}=[(Lsc-N_{RES})/N] \quad (2)$$

$$Ls=(Lsc-N_{RES})-N \times N_{CR}-1 \quad (3)$$

After the step 1707 or 1713, the sub-code generator sequentially transmits symbols from the starting point Fs to the $(N-1)^{th}$ symbol position in step 1709. Next, the sub-code generator repeats all of the N symbols as many times as $N_{CR}$ before transmission. Lastly, the sub-code generator transmits symbols from the $0^{th}$ symbol position to the $Ls^{th}$ symbol position, and then proceeds to step 1715. After transmitting the symbols corresponding to the sub-code, the sub-code generator chooses the starting point Fs from the determined SPIDs in step 1715. Here, the sub-code generator chooses, as the starting point Fs of the next sub-packet, a non-zero point out of the points corresponding to the SPID (or Fs) equal to or nearest to the last point Ls of the previous sub-packet (or sub-code). That is, the sub-code generator excludes the SPID allocated for initial transmission from retransmission. The sub-code generator determines in step 1717 whether a next sub-packet (or retransmission) is requested. Here, "the next packet is requested" means that retransmission of the current encoder packet (EP) transmitted by the transmitter is requested due to failure to receive the encoder packet. Thus, the SPID should not be reset, and it should be connected to the next SPID. Therefore, if transmission of the next sub-packet is requested, the sub-code generator returns to step 1703 and repeats the above steps. Otherwise, if transmission of the next sub-packet is not requested, it means that the SPID should be reset. In this case, since the currently transmitted EP is successfully received and thus transmission of a new EP is requested, the sub-code generator returns to step 1701.

As described above, the present invention minimizes symbol overlapping and symbol puncturing between sub-codes when generating QCTCs in the SSPM or FSPM, thereby improving throughput.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting a sub-code at a sub-code rate identical to or different from a code rate of a turbo encoder, said sub-code based on a channel environment and derived from a QCTC (Quasi-Complementary Turbo Code) generated by the turbo encoder and a sub-code generator, the turbo encoder receiving an information bit stream, generating information symbols and first and second parity symbols from the information bit stream and operating at the code rate, and the sub-code generator generating sub-codes from the information symbols and the first and second parity symbols, the method comprising the steps of:

segmenting a length N of the QCTC into a predetermined number of sections, determining SPIDs (Sub-code Packet Identifications) corresponding to the segmented sections, and specifying one of the SPIDs allocated for initial transmission of the sub-code;

calculating a number of remaining symbols represented by N-Fs, where N is a length of the QCTC and Fs is a starting symbol position of the sub-code of the QCTC;

determining a last symbol position Ls of the sub-code based on the number of the remaining symbols and a length of the sub-code; and sequentially transmitting symbols of the sub-code from the starting symbol position Fs to the last symbol position Ls.

2. The method as claimed in claim 1, further comprising the step of choosing, as a starting symbol position of a retransmission sub-code, an SPID nearest to the last symbol position Ls from among the SPIDs except for the specified SPID when a retransmission request for the transmitted sub-code is received by the turbo encoder.

3. The method as claimed in claim 2, wherein the nearest SPID is an SPID in a position nearest to the last symbol position Ls from among the SPIDs that are less than or equal to the last symbol position Ls of the SPIDs.

4. The method as claimed in claim 1, further comprising the step of choosing, as a starting symbol position of a retransmission sub-code, an SPID nearest to the last symbol position Ls from among the SPIDs when a retransmission request for the transmitted sub-code is received by the turbo encoder.

5. The method as claimed in claim 4, wherein the nearest SPID is an SPID in a position nearest to the last symbol position Ls from among the SPIDs that are less than or equal to the last symbol position Ls of the SPIDs.

6. The method as claimed in claim 1, wherein if the number of the remaining symbols is greater than or equal to the length of the sub-code, the last symbol position Ls is updated to a position represented by Fs+Lsc−1, where Lsc is a length of the sub-code.

7. The method as claimed in claim 1, wherein if the number of the remaining symbols is less than the length of the sub-code, the last symbol position Ls is determined as a position represented by $(Lsc-N_{RES})-N \times N_{CR}-1$, where Lsc indicates the length of the sub-code, $N_{RES}$ indicates the number of the remaining symbols, N indicates the length of the QCTC, and $N_{CR}$ indicates a repetition frequency determined to generate a codeword with the length N.

8. A method for transmitting a sub-code at a sub-code rate identical to or different from a code rate of a turbo encoder, said sub-code based on a channel environment and derived from a QCTC (Quasi-Complementary Turbo Code) generated by the turbo encoder and a sub-code generator, the turbo encoder receiving an information bit stream, generating information symbols and first and second parity symbols from the information bit stream and operating at the code rate, and the sub-code generator generating sub-codes from the information symbols and the first and second parity symbols, the method comprising the steps of:

calculating a number of remaining symbols represented by N-Fs, where N is a code word length of the QCTC and Fs is a starting symbol position of the sub-code of the QCTC;

determining a last symbol position Ls of the sub-code based on the number of the remaining symbols and a length of the sub-code; and sequentially transmitting symbols of the sub-code from the starting symbol position Fs to the last symbol position Ls.

9. The method as claimed in claim 8, further comprising the step of choosing a starting symbol position of a retransmission sub-code represented by (Ls+1) mod N, where Ls is the last symbol position and N is the length of the QCTC, when a retransmission request for the transmitted sub-code is received by the turbo encoder.

10. The method as claimed in claim 8, wherein if the number of the remaining symbols is greater than or equal to the length of the sub-code, the last symbol position Ls is updated to a position represented by Fs+Lsc−1, where Lsc is the length of the sub-code.

11. The method as claimed in claim 8, wherein if the number of the remaining symbols is less than the length of the sub-code, the last symbol position Ls is determined as a position represented by $(Lsc-N_{RES})-N \times N_{CR}-1$, where Lsc indicates the length of the sub-code, $N_{RES}$ indicates the number of the remaining symbols, N indicates the length of the QCTC, and $N_{CR}$ indicates a repetition frequency determined to generate a codeword with the length N.

12. An apparatus for transmitting a sub-code in a communication system, comprising:

a turbo encoder;

an interleaver for interleaving a symbol stream from the turbo encoder; and a sub-code generator for generating a QCTC (Quasi-Complementary Turbo Code) by receiving the symbol stream interleaved by the interleaver, generating sub-codes from the received symbol stream and transmitting a sub-code at a sub-code rate equal to or different from a code rate of the turbo encoder and derived from the QCTC;

the sub-code generator including;

segmenting a length N of the QCTC into a predetermined number of sections, determining SPIDs (Sub-code Packet Identifications) corresponding to the segmented sections, and specifying one of the SPIDs allocated for initial transmission of the sub-code;

calculating a number of remaining symbols represented by N-Fs, where N is a length of the QCTC and Fs is a starting symbol position of the sub-code of the QCTC;

determining a last symbol position Ls of the sub-code based on the number of the remaining symbols and a length of the sub-code; and sequentially transmitting symbols of the sub-code from the starting symbol position Fs to the last symbol position Ls.

13. The apparatus as claimed in claim 12, wherein the sub-code generator chooses, as a starting symbol position of a retransmission sub-code, an SPID nearest to the last symbol position Ls from among the SPIDs except for the specified SPID when a retransmission request for the transmitted sub-code is received by the turbo encoder.

14. The apparatus as claimed in claim 13, wherein the nearest SPID is an SPID in a position nearest to the last symbol position Ls from among the SPIDs that are less than or equal to the last symbol position Ls of the SPIDs.

15. The apparatus as claimed in claim 12, wherein the sub-code generator chooses, as a starting symbol position of a retransmission sub-code, an SPID nearest to the last symbol position Ls from among the SPIDs when a retransmission request for the transmitted sub-code is received by the turbo encoder.

16. The apparatus as claimed in claim 15, wherein the nearest SPID is an SPID in a position nearest to the last symbol position Ls from among the SPIDs that are less than or equal to the last symbol position Ls of the SPIDs.

17. The apparatus as claimed in claim 12, wherein if the number of the remaining symbols is greater than or equal to the length of the sub-code, the sub-code generator updates the last symbol position Ls to a position represented by Fs+Lsc−1, where Fs is the starting symbol position and Lsc is a length of the sub-code.

18. The apparatus as claimed in claim 12, wherein if the number of the remaining symbols is less than the length of the sub-code, the sub-code generator chooses, as the last symbol position Ls, a position represented by $(Lsc-N_{RES})-N \times N_{CR}-1$, where Lsc indicates the length of the sub-code, $N_{RES}$ indicates the number of the remaining symbols, N indicates the length of the QCTC, and $N_{CR}$ indicates a repetition frequency determined to generate a codeword with the length N.

19. An apparatus for transmitting a sub-code in a communication system, comprising:
   a turbo encoder;
   an interleaver for interleaving a symbol stream from the turbo encoder; and
   a sub-code generator for generating a QCTC (Quasi-Complementary Turbo Code) by receiving the symbol stream interleaved by the interleaver, generating sub-codes from the received symbol stream and transmitting a sub-code at a sub-code rate equal to or different from a code rate of the turbo encoder and derived from the QCTC;
   the sub-code generator including;
   calculating a number of remaining symbols represented by N-Fs, where N is a length of the QCTC and Fs is a starting symbol position of the sub-code of the QCTC;
   determining a last symbol position Ls of the sub-code based on the number of the remaining symbols and a length of the sub-code; and
   sequentially transmitting symbols of the sub-code from the starting symbol position Fs to the last symbol position Ls.

20. The apparatus as claimed in claim 19, wherein the sub-code generator chooses a starting symbol position of a retransmission sub-code represented by (Ls+1) mod N, where Ls is the last symbol position and N is the length of the QCTC, when a retransmission request for the transmitted sub-code is received by the turbo encoder.

21. The apparatus as claimed in claim 19, wherein if the number of the remaining symbols is greater than or equal to the length of the sub-code, the sub-code generator updates the last symbol position Ls to a position represented by Fs+Lsc−1, where Fs is the starting symbol position and Lsc is a length of the sub-code.

22. The apparatus as claimed in claim 19, wherein if the number of the remaining symbols is less than the length of the sub-code, the sub-code generator chooses, as the last symbol position Ls, a position represented by $(Lsc-N_{RES})-N \times N_{CR}-1$, where Lsc indicates the length of the sub-code, $N_{RES}$ indicates the number of the remaining symbols, N indicates the length of the QCTC, and $N_{CR}$ indicates a repetition frequency determined to generate a codeword with the length N.

\* \* \* \* \*